US012757827B2

(12) United States Patent
Vandike et al.

(10) Patent No.: US 12,757,827 B2
(45) Date of Patent: Oct. 13, 2026

(54) SYSTEMS AND METHODS FOR COORDINATING WORK MACHINES DURING MATERIAL TRANSFER

(71) Applicant: Deere & Company, Moline, IL (US)

(72) Inventors: Nathan R. Vandike, Geneseo, IL (US); Bhanu Kiran Reddy Palla, Bettendorf, IA (US)

(73) Assignee: Deere & Company, Moline, IL (US)

( * ) Notice: Subject to any disclaimer, the term of this patent is extended or adjusted under 35 U.S.C. 154(b) by 522 days.

(21) Appl. No.: 18/171,549

(22) Filed: Feb. 20, 2023

(65) Prior Publication Data

US 2024/0049635 A1 Feb. 15, 2024

Related U.S. Application Data

(63) Continuation of application No. PCT/US2022/040065, filed on Aug. 11, 2022.

(51) Int. Cl.

| | |
|---|---|
| ***A01D 41/00*** | (2006.01) |
| ***A01D 41/127*** | (2006.01) |
| ***A01D 43/07*** | (2006.01) |

(52) U.S. Cl.
CPC ......... *A01D 41/1274* (2013.01); *A01D 43/07* (2013.01)

(58) Field of Classification Search
CPC ... A01D 41/1274; A01D 43/07; A01D 41/127
See application file for complete search history.

(56) References Cited

U.S. PATENT DOCUMENTS

| | | | |
|---|---|---|---|
| 6,037,901 | A | 3/2000 | Devier et al. |
| 6,128,574 | A | 10/2000 | Diekhans |
| 6,216,071 | B1 | 4/2001 | Motz |
| 6,327,569 | B1 | 12/2001 | Reep |
| 6,360,179 | B1 | 3/2002 | Reep |
| 6,587,772 | B2 | 7/2003 | Behnke |
| 6,687,616 | B1 | 2/2004 | Peterson et al. |
| 7,155,888 | B2 | 1/2007 | Diekhans |
| 7,261,632 | B2 | 8/2007 | Pirro et al. |
| 7,555,283 | B2 | 6/2009 | Fitzner et al. |
| 7,562,167 | B2 | 7/2009 | Anderson |

(Continued)

FOREIGN PATENT DOCUMENTS

| | | | |
|---|---|---|---|
| AU | 2021229157 | A1 | 4/2022 |
| CA | 3081383 | A1 | 5/2019 |

(Continued)

OTHER PUBLICATIONS

The International Search Report and the Written Opinion of the International Searching Authority issued in counterpart application No. PCT/US2022/40065, dated Nov. 4, 2022, 16 pages.

(Continued)

*Primary Examiner* — Anne Marie Antonucci
*Assistant Examiner* — Jordan T Smith
(74) *Attorney, Agent, or Firm* — Christopher J. Volkmann; KELLY, HOLT & CHRISTENSON PLLC

(57) ABSTRACT

An agricultural harvesting system includes a control system that is configured to obtain a map that maps values of a speed characteristic of an agricultural harvester to different geographic locations in a worksite. The control system is further configured to generate a control signal to control a receiving machine based on the map.

20 Claims, 12 Drawing Sheets

(56) References Cited

U.S. PATENT DOCUMENTS 7,725,233 B2 5/2010 Hendrickson et al.
7,756,624 B2 7/2010 Diekhans et al.
8,060,283 B2 11/2011 Mott et al.
8,145,393 B2 3/2012 Foster et al.
8,254,351 B2 8/2012 Fitzner et al.
8,280,595 B2 10/2012 Foster et al.
8,437,901 B2 5/2013 Anderson
8,606,454 B2 12/2013 Wang et al.
8,626,406 B2 1/2014 Schleicher et al.
8,639,408 B2 1/2014 Anderson
8,738,238 B2 5/2014 Rekow
8,781,692 B2 7/2014 Korman
8,868,304 B2 10/2014 Bonefas
8,942,860 B2 1/2015 Morselli
9,014,901 B2 4/2015 Wang et al.
9,188,986 B2 11/2015 Baumann
9,326,444 B2 5/2016 Bonefas
9,392,746 B2 7/2016 Darr et al.
9,523,180 B2 12/2016 Deines
9,529,364 B2 12/2016 Foster et al.
9,605,583 B2 3/2017 Goering et al.
9,642,305 B2 5/2017 Nykamp et al.
9,675,008 B1 6/2017 Rusciolelli et al.
9,772,625 B2 9/2017 Gilmore et al.
9,992,931 B2 6/2018 Bonefas et al.
9,992,932 B2 6/2018 Bonefas et al.
10,015,928 B2 7/2018 Nykamp et al.
10,064,335 B2 9/2018 Byttebier et al.
10,126,282 B2 11/2018 Anderson et al.
10,129,528 B2 11/2018 Bonefas et al.
10,317,272 B2 6/2019 Bhavsar et al.
10,398,084 B2 9/2019 Ray et al.
10,537,061 B2 1/2020 Farley et al.
10,677,637 B1 6/2020 Von Muenster
10,760,946 B2 9/2020 Meier et al.
10,809,118 B1 10/2020 Von Muenster
10,830,634 B2 11/2020 Blank et al.
10,890,922 B2 1/2021 Ramm et al.
10,966,071 B2 3/2021 Suleman et al.
11,008,177 B2 5/2021 Banthia et al.
11,112,262 B2 9/2021 Anderson
2002/0083695 A1 7/2002 Behnke et al.
2004/0116169 A1 6/2004 Isfort et al.
2005/0279070 A1 12/2005 Pirro et al.
2005/0284119 A1 12/2005 Brunnert
2006/0047418 A1 3/2006 Metzler et al.
2006/0094487 A1 5/2006 Huster et al.
2007/0037621 A1 2/2007 Isfort
2007/0089390 A1 4/2007 Hendrickson et al.
2008/0245042 A1 10/2008 Brunnert et al.
2009/0044505 A1 2/2009 Huster et al.
2009/0306835 A1 12/2009 Ellermann et al.
2010/0070145 A1 3/2010 Foster et al.
2010/0332051 A1 12/2010 Kormann
2011/0022273 A1 1/2011 Peters et al.
2011/0061762 A1 3/2011 Madsen et al.
2011/0066337 A1 3/2011 Kormann
2011/0160961 A1 6/2011 Wollenhaupt et al.
2011/0205084 A1 8/2011 Morselli et al.
2011/0224873 A1 9/2011 Reeve et al.
2012/0029732 A1 2/2012 Meyer
2012/0085458 A1 4/2012 Wenzel
2012/0087771 A1 4/2012 Wenzel
2012/0215394 A1 8/2012 Wang et al.
2012/0215409 A1 8/2012 Wang et al.
2012/0237083 A1 9/2012 Lange et al.
2012/0263560 A1 10/2012 Diekhans et al.
2012/0265412 A1 10/2012 Diekhans et al.
2012/0302299 A1 11/2012 Behnke et al.
2013/0019580 A1 1/2013 Anderson et al.
2013/0022430 A1 1/2013 Anderson et al.
2013/0211675 A1 8/2013 Bonefas
2013/0213518 A1 8/2013 Bonefas
2013/0227922 A1 9/2013 Zametzer et al.
2013/0231823 A1 9/2013 Wang et al.
2014/0121882 A1 5/2014 Gilmore et al.
2014/0224377 A1 8/2014 Bonefas
2014/0311113 A1 10/2014 Bonefas
2014/0324272 A1 10/2014 Madsen et al.
2015/0094944 A1 4/2015 Baumann
2015/0189832 A1 7/2015 Krause et al.
2016/0061643 A1 3/2016 Wilson et al.
2016/0183463 A1 6/2016 Herman et al.
2016/0252384 A1 9/2016 Wilson et al.
2016/0258339 A1* 9/2016 Goering .................... F01P 7/04
2016/0270294 A1 9/2016 Viaene et al.
2016/0327425 A1 11/2016 Gagas
2017/0042088 A1 2/2017 Nykamp et al.
2017/0049053 A1 2/2017 Bonefas et al.
2017/0055446 A1* 3/2017 Nykamp .............. A01D 43/087
2017/0086378 A1 3/2017 Lisouski et al.
2017/0206645 A1 7/2017 Bonefas et al.
2017/0245435 A1 8/2017 Rusciolelli et al.
2017/0276534 A1 9/2017 Vermue et al.
2018/0022559 A1 1/2018 Knutson
2018/0037424 A1 2/2018 Green et al.
2019/0261560 A1 8/2019 Jelenkovic
2019/0351765 A1 11/2019 Rabusic
2019/0364734 A1 12/2019 Kriebel et al.
2020/0064144 A1 2/2020 Tomita et al.
2020/0064863 A1 2/2020 Tomita et al.
2020/0090094 A1 3/2020 Blank
2020/0128734 A1 4/2020 Brammeier et al.
2020/0128737 A1* 4/2020 Anderson .............. A01D 91/04
2020/0128738 A1 4/2020 Suleman et al.
2020/0128740 A1 4/2020 Suleman
2020/0133262 A1 4/2020 Suleman et al.
2020/0137957 A1 5/2020 Friesen
2020/0187409 A1 6/2020 Meyer zu Helligen
2020/0196526 A1 6/2020 Koch et al.
2020/0317114 A1 10/2020 Hoff
2020/0319632 A1 10/2020 Desai et al.
2020/0319655 A1* 10/2020 Desai ................... G05D 1/0291
2020/0352099 A1 11/2020 Meier et al.
2020/0359547 A1 11/2020 Sakaguchi et al.
2020/0359549 A1 11/2020 Sakaguchi et al.
2020/0375083 A1 12/2020 Anderson et al.
2020/0375084 A1 12/2020 Sakaguchi et al.
2020/0378088 A1 12/2020 Anderson
2020/0404842 A1 12/2020 Dugas et al.
2021/0015041 A1 1/2021 Bormann et al.
2021/0022283 A1* 1/2021 Vandike ............. G01C 21/3807
2021/0026362 A1 1/2021 Wilson et al.
2021/0029877 A1 2/2021 Vandike et al.
2021/0099522 A1 4/2021 Chiocco et al.
2021/0294337 A1 9/2021 Van Mill et al.
2021/0333802 A1* 10/2021 Singh .................... B60W 10/04
2021/0337729 A1 11/2021 O'Connor et al.
2021/0339729 A1 11/2021 O'Connor et al.
2022/0015288 A1 1/2022 Christiansen et al.
2022/0019238 A1 1/2022 Christiansen et al.
2022/0019239 A1 1/2022 Christiansen et al.
2022/0019240 A1 1/2022 Christiansen et al.
2022/0019241 A1 1/2022 Christiansen et al.
2022/0026230 A1* 1/2022 Sidon ................... G05B 19/042
2022/0039318 A1 2/2022 Raste et al.
2022/0095539 A1 3/2022 Faust et al.
2022/0110238 A1 4/2022 Vandike et al.
2022/0110246 A1 4/2022 Vandike et al.
2022/0110253 A1 4/2022 Anderson et al.
2022/0110255 A1 4/2022 Vandike et al.
2022/0110262 A1 4/2022 Vandike et al.
2022/0113727 A1 4/2022 Vandike et al.
2022/0117143 A1 4/2022 Kraus et al.
2022/0122197 A1 4/2022 Hanrieder
2022/0132736 A1 5/2022 Meyers et al.
2022/0132737 A1 5/2022 Anderson et al.
2022/0176818 A1 6/2022 Piscopo et al.
2022/0197302 A1 6/2022 McClelland et al.
2022/0204051 A1 6/2022 Rands et al.
2022/0204052 A1 6/2022 Creaby et al.
2022/0206512 A1 6/2022 Rands et al.
2022/0207852 A1 6/2022 Sharma et al.
2022/0225568 A1 7/2022 Töniges et al.

(56) References Cited

U.S. PATENT DOCUMENTS

| | | | |
|---|---|---|---|
| 2022/0232763 | A1 | 7/2022 | Reddy Palla et al. |
| 2022/0232770 | A1 | 7/2022 | Yanke et al. |
| 2022/0256770 | A1 | 8/2022 | Faust et al. |
| 2022/0304227 | A1 | 9/2022 | Hill et al. |
| 2022/0304231 | A1 | 9/2022 | Faust et al. |
| 2022/0374026 | A1 | 11/2022 | Vougioukas et al. |
| 2022/0382277 | A1 | 12/2022 | Nishii et al. |
| 2022/0408645 | A1 | 12/2022 | O'Connor et al. |
| 2022/0410704 | A1 | 12/2022 | O'Connor et al. |
| 2023/0027697 | A1 | 1/2023 | Rush |
| 2023/0031013 | A1 | 2/2023 | Faust et al. |
| 2023/0035890 | A1 | 2/2023 | McKinney et al. |
| 2023/0039718 | A1* | 2/2023 | Suleman ........... B60W 60/0027 |
| 2023/0041687 | A1 | 2/2023 | Kormann |

FOREIGN PATENT DOCUMENTS

| | | | |
|---|---|---|---|
| CN | 103181263 | A | 7/2013 |
| CN | 111201879 | A | 5/2020 |
| CN | 111406505 | A | 7/2020 |
| CN | 114846991 | A | 8/2022 |
| CN | 114915637 | A | 8/2022 |
| CN | 115067061 | A | 9/2022 |
| CN | 115280960 | A | 11/2022 |
| CN | 115643895 | A | 1/2023 |
| DE | 102009041646 | | 3/2011 |
| DE | 102010004648 | | 7/2011 |
| DE | 202012103730 | | 10/2012 |
| DE | 102012211001 | A1 | 1/2014 |
| DE | 102013012027 | A1 | 1/2015 |
| DE | 102011005400 | | 5/2015 |
| DE | 102015109799 | A1 | 12/2016 |
| DE | 102017204511 | A1 | 9/2018 |
| DE | 102011052688 | | 2/2021 |
| DE | 102020124508 | A1 | 3/2022 |
| EP | 1219153 | A2 | 7/2002 |
| EP | 1219159 | | 7/2002 |
| EP | 1674324 | A1 | 6/2006 |
| EP | 1609349 | | 5/2008 |
| EP | 2057884 | | 5/2009 |
| EP | 1731983 | | 9/2009 |
| EP | 2174537 | A1 | 4/2010 |
| EP | 2186389 | A1 | 5/2010 |
| EP | 2301318 | | 11/2011 |
| EP | 2146307 | | 5/2012 |
| EP | 2608057 | A1 | 10/2012 |
| EP | 2621258 | A1 | 8/2013 |
| EP | 2786325 | A1 | 10/2014 |
| EP | 2829171 | A2 | 1/2015 |
| EP | 2452551 | | 5/2017 |
| EP | 2995191 | B1 | 10/2017 |
| EP | 3315006 | A1 | 5/2018 |
| EP | 3315007 | A1 | 5/2018 |
| EP | 3316218 | A1 | 5/2018 |
| EP | 3289853 81 | | 3/2019 |
| EP | 3289852 | B1 | 6/2019 |
| EP | 3000307 | B1 | 12/2019 |
| EP | 3593620 | A1 | 1/2020 |
| EP | 3243374 | B1 | 3/2020 |
| EP | 2812267 | B1 | 2/2021 |
| EP | 3847878 | A1 | 7/2021 |
| EP | 3706544 | | 12/2021 |
| EP | 3970471 | A1 | 3/2022 |
| EP | 3315005 | B1 | 4/2022 |
| GB | 2517049 | A | 2/2015 |
| IN | 202241032643 | A | 6/2022 |
| JP | 2002186348 | A | 7/2002 |
| JP | 2015084667 | A | 5/2016 |
| JP | 2018068284 | A | 5/2018 |
| JP | 2019004796 | A | 1/2019 |
| JP | 2019216744 | A | 12/2019 |
| JP | 2020127405 | A | 8/2020 |
| JP | 2021069341 | A | 5/2021 |
| JP | 2022141070 | A | 9/2022 |
| RU | 2529905 | | 10/2014 |
| UA | 90246 | | 4/2010 |
| WO | 2012110544 | | 8/2012 |
| WO | 2013086351 | | 6/2013 |
| WO | WO2013087275 | A1 | 6/2013 |
| WO | 2013120079 | A1 | 8/2013 |
| WO | 2013141975 | A2 | 9/2013 |
| WO | 2013151619 | A2 | 10/2013 |
| WO | 2013162673 | A2 | 10/2013 |
| WO | 2013184177 | A2 | 12/2013 |
| WO | 2013184178 | A2 | 12/2013 |
| WO | 2014046685 | | 3/2014 |
| WO | 2014116819 | A1 | 7/2014 |
| WO | WO2018043336 | A1 | 3/2018 |
| WO | WO2018112615 | A1 | 6/2018 |
| WO | WO2018116772 | A1 | 6/2018 |
| WO | 2018142768 | A1 | 8/2018 |
| WO | 2018185522 | A1 | 10/2018 |
| WO | 2018226139 | A1 | 12/2018 |
| WO | WO2019124174 | A1 | 6/2019 |
| WO | WO2019124217 | A1 | 6/2019 |
| WO | WO2019124273 | A1 | 6/2019 |
| WO | WO2019124225 | A1 | 8/2019 |
| WO | 2019215185 | A1 | 11/2019 |
| WO | WO2020026578 | A1 | 2/2020 |
| WO | WO2020026650 | A1 | 2/2020 |
| WO | WO2020026651 | A1 | 2/2020 |
| WO | WO2020031473 | A1 | 2/2020 |
| WO | WO2020038810 | A1 | 2/2020 |
| WO | WO2020039671 | A1 | 2/2020 |
| WO | WO2020044726 | A1 | 3/2020 |
| WO | WO202082182 | A1 | 4/2020 |
| WO | WO2020100810 | A1 | 5/2020 |
| WO | WO2020110920 | A1 | 6/2020 |
| WO | 2020206941 | A1 | 10/2020 |
| WO | WO2020206942 | A1 | 10/2020 |
| WO | WO21049098 | A1 | 3/2021 |
| WO | WO21246384 | A1 | 12/2021 |
| WO | 2022118572 | A1 | 6/2022 |
| WO | WO22130038 | A1 | 6/2022 |
| WO | WO22130039 | A1 | 6/2022 |
| WO | WO22268779 | A2 | 12/2022 |
| WO | WO 2024035409 | A1 | 2/2024 |

OTHER PUBLICATIONS

Extended European Search Report and Written Opinion issued in European Patent Application No. 22955170.0 dated Apr. 8, 2026, in 07 pages.

* cited by examiner

SYSTEMS AND METHODS FOR COORDINATING WORK MACHINES DURING MATERIAL TRANSFER

CROSS-REFERENCE TO RELATED APPLICATION

The present application is U.S. Bypass Continuation of and claims priority of PCT/US2022/040065, filed Aug. 11, 2022, the content of which is hereby incorporated by reference in its entirety.

FIELD OF THE DESCRIPTION

The present descriptions relates to mobile machines, particularly mobile agricultural machines configured to carry and transport material, such as agricultural harvesters and agricultural material receiving machines.

BACKGROUND

There are a wide variety of different mobile machines. Some mobile machines carry, receive, and transport materials. For example, an agricultural harvester includes a material receptacle, such as an on-board grain tank, that receives and holds crop material, such as grain, harvested by the agricultural harvester. In other examples, a material receiving machine includes a towing vehicle, such as a truck or a tractor, and a towed material receptacle, such as a grain cart or trailer. The towed material receptacle receives and holds material, such as harvested crop material, and is transported by the towing vehicle.

The discussion above is merely provided for general background information and is not intended to be used as an aid in determining the scope of the claimed subject matter.

SUMMARY

An agricultural harvesting system includes a control system that is configured to obtain a map that maps values of a speed characteristic of an agricultural harvester to different geographic locations in a worksite. The control system is further configured to generate a control signal to control a receiving machine based on the map.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
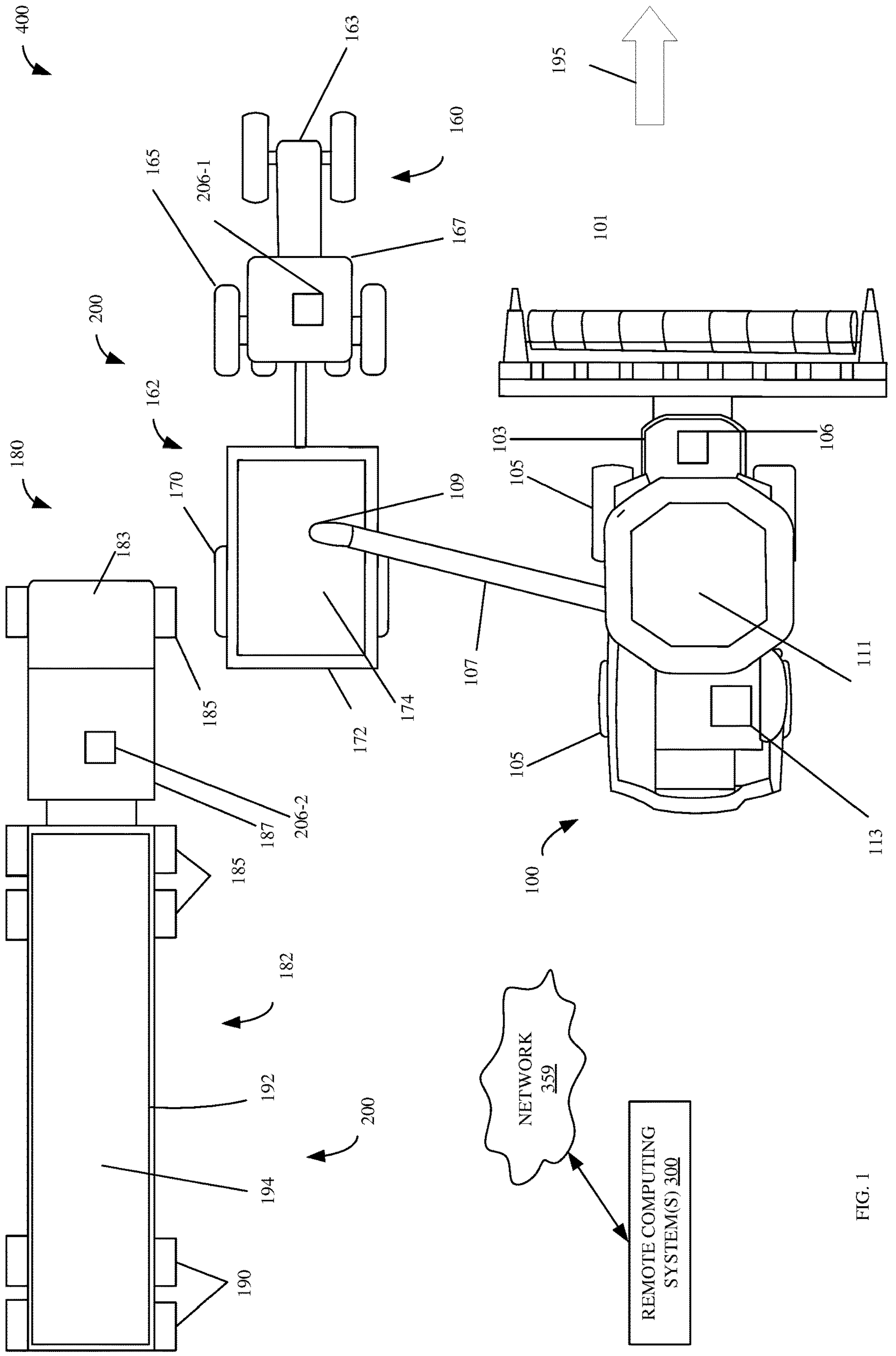
FIG. 1 is a partial plan view, partial pictorial illustration of one example of an agricultural system, including, an agricultural harvester and receiving machine(s), according to some examples of the present disclosure.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

During a combine harvesting operation an agricultural harvester generally operates at a given speed based on conditions at the worksite to control one or more operational aspects (e.g., performance) of the agricultural harvester, such as a feedrate of material through the agricultural harvester. As the agricultural harvester continues to harvest crop, an on-board grain tank on the agricultural harvester progressively fills, eventually reaching a level where it needs to be emptied by way of a material transfer operation wherein a material transfer subsystem (including a chute, spout, and auger or blower, as well as various actuators) conveys the harvested material to a receiving machine. During the transfer process, an operator of the receiving machine will generally drive alongside the agricultural harvester at a given distance and attempt to match the speed of the agricultural harvester, temporarily increasing the speed (accelerating) or decreasing the speed (decelerating) of the receiving machine to adjust the fore-to-aft position of the receiving machine relative to the fore-to-aft position of the agricultural harvester according to a fill strategy, that is, to adjust the location in the grain bin of the receiving machine where the harvested material is being conveyed.

In other examples, such as a forage harvesting operation, the forage harvester generally operates at a given speed based on conditions at the worksite to control one or more operational aspects (e.g., performance) of the forage harvester, such as a feedrate of material through the forage harvester. Generally, forage harvesters continually transfer material, via a material transfer subsystem (including chute, spout, and auger or blower, as well as various actuators), to a receiving machine that travels alongside or behind the forage harvester. During the transfer process, an operator of the receiving machine will generally attempt to maintain a given distance from the forage harvester and attempt to match the speed of the forage harvester, temporarily increasing the speed (accelerating) or decreasing the speed (decelerating) of the receiving machine to adjust the position of the receiving machine relative to the position of the forage harvester according to a fill strategy, that is, to adjust the location in the grain bin of the receiving machine where the harvested material is being conveyed.

In some current systems, operators attempt to eyeball the operation and manually adjust position and speed of their respective machine. The performance in this type of system can vary widely given the experience and fatigue of the operators, as well as mistakes from human error, which can result in spill of harvested material. Other current systems control the agricultural harvester to travel at a set speed during the transfer process, which can be suboptimal relative to desired performance of the harvesting operation (e.g., suboptimal for desired feedrate, completion time, etc.). In some current systems, the speed of the agricultural harvester is communicated to the operator or control system of the receiving vehicle which is used to control the travel speed, acceleration, and/or deceleration of the receiving vehicle. In such a system, there is latency that can result in deleterious effects, for instance, the delay between change in speed of the agricultural harvester, communication of the change in speed of the agricultural harvester, and resultant change in speed of the receiving machine can lead to reduced performance, such as material spill.

Thus, it would be useful to provide to a receiving machine or receiving machine operator and indication of speed values of the agricultural harvesting machine along its travel path ahead of the agricultural harvesting machine so that the receiving machine can be predictively controlled. In some examples, this indication can be in the form of a predictive speed map that includes geolocated predictive speed characteristic values indicative of a travel speed, acceleration, and deceleration of the agricultural harvester at different locations on the worksite (field). In other examples, the speed map can be a prescriptive speed map that includes geolocated commanded or prescribed agricultural harvester speed characteristic values of the agricultural harvester at different locations at the worksite.

In some examples, the present description relates to using in-situ data taken concurrently with an operation, in combination with prior or predicted data, such as prior or predicted data represented in an information map, to generate a predictive model and a predictive map, such as a predictive speed model and predictive speed map. In some examples, the predictive speed map can be used to control a mobile machine.

In some examples, the predictive speed map can be provided to or otherwise used by a receiving machine to control the receiving machine during the agricultural harvesting operation, such as during a material transfer operation during the agricultural harvesting operation.

In some examples, a vegetative index (VI) map is provided as an information map. A vegetative index map illustratively maps vegetative index values (which may be indicative of vegetative growth) across different geographic locations in a field of interest. One example of a vegetative index includes a normalized difference vegetation index (NDVI). There are many other vegetative indices that are within the scope of the present disclosure. In some examples, a vegetative index may be derived from sensor readings of one or more bands of electromagnetic radiation reflected by the plants. Without limitations, these bands may be in the microwave, infrared, visible or ultraviolet portions of the electromagnetic spectrum.

A vegetative index map can be used to identify the presence and location of vegetation. In some examples, these maps enable vegetation to be identified and georeferenced in the presence of bare soil, crop residue, or other plants, including crop or other weeds.

In some examples, a predictive yield map is provided. A predictive yield map illustratively maps predictive yield values across different geographic locations in a field of interest. In some examples, a predictive yield map be derived from sensor reading of one or more bands of electromagnetic radiation reflected by the plants. In some examples, the predictive yield map may be derived from vegetative index values, such as vegetative index values contained in a vegetative index map of the field. In some examples, the predictive yield map may be derived from historical yield values, such as yield values from a previous harvesting operation at the same worksite (or at a different worksite, such as a different worksite with similar crop plants). In some examples, the predictive yield map can be generated during the harvesting operation, such as by modeling a relationship between detected yield and one or more characteristics of the worksite (such as one or more characteristics of the worksite as represented in one or maps of the worksite). Based on the modeled relationship, and the values of the one or more characteristics of the worksite in the map, a predictive yield map can be generated that maps predictive yield values at different locations based on the modeled relationship and on the characteristics at those different locations as provided by the one or more maps. The predictive yield map can be generated in a variety of other ways.

In some examples, a biomass map is provided. A biomass map illustratively maps a measure of biomass in the field being harvested at different locations in the field. A biomass map may be generated from vegetative index values, from historically measured or estimated biomass levels, from images or other sensor readings taken during a previous operation in the field, or in various other ways. In some examples, biomass may be adjusted by a factor representing a portion of total biomass passing through the agricultural harvester. For corn, this factor is typically around 50%. In some examples, this factor may vary based on crop moisture. In some examples, the factor may represent a portion of weed material or weed seeds. In some examples, the factor may represent a portion of one crop in an intercrop mix.

In some examples, a crop state map is provided. Crop state may define whether the crop is down, standing, partially down, the orientation of down or partially down crop relative to the ground surface or to a compass direction, and other things. A crop state map illustratively maps the crop state in the field being harvested at different locations in the field. A crop state map may be generated from aerial or other images of the field, from images or other sensor readings taken during a prior operation in the field or in other ways prior to harvesting. A crop state may be generated in a variety of other ways.

In some examples, a topographic map is provided as an information map. A topographic map illustratively maps topographic characteristics (e.g., elevation, slope, etc.) across different locations in a field of interest. The topographic map may be generated from sensor readings of the worksite, such as laser-based (e.g., lidar) or other distance measuring sensor systems (e.g., ultrasonic, radar, etc.), taken during a previous operation on the field or during a survey of the field (e.g., aerial survey, such as plane, drone, satellite). Additionally, in some other examples, geographic position data as well as machine orientation data (e.g., pitch, roll, and yaw data) during a prior operation on the field can be used to generate the topographic map. The topographic map can be generated in a variety of other way.

In some examples, a soil property map is provided as an information map. A soil property map illustratively maps a measure of one or more soil properties such as soil type, soil chemical constituents, soil structure, residue coverage, tillage history, or soil moisture in the field being harvested at different locations in the field. A soil properties map may be generated from vegetative index values, from historically measured or estimated soil properties, from images or other sensor readings taken during a previous operation in the field, or in various other ways.

In some examples, a seeding map is provided. A seeding map may map seeding characteristics such as seed locations, seed variety, or seed population to different locations in the field. The seeding map may be generated during a past seed planting operation in the field. The seeding map may be derived from control signals used by a seeder when planting seeds or from sensors on the seeder that confirm that a seed was metered or planted. Seeders may also include geographic position sensors that geolocate the seed characteristics on the field.

In some examples, various other information maps are provided which can map a variety of other characteristic to different locations in a field of interest.

While the various examples described herein proceed with respect to mobile agricultural machines, such as agricultural harvesters, and agricultural material receiving machines, it will be appreciated that the systems and methods described herein are applicable to various other mobile machines, various other machine operations, as well as various other materials, for example forestry machines, forestry operations, and forestry materials, constructions machines, construction operations, and construction materials, and turf management machines, turf management operations, and turf management materials. Additionally, it will be appreciated that the systems and methods described herein are applicable to various mobile agricultural machines, for example, but not by limitation, dry material spreaders, seeding and planting machines, as well as various other mobile agricultural machines configured to receive, hold, and transport material(s). For illustration, but not by limitation, a dry material spreader can include a dry material receptacle that receives, holds, and transports dry material, such as dry fertilizer, that is to be spread on a worksite.

FIG. 1 is a partial plan view, partial pictorial illustration of an agricultural system 400 and shows an agricultural harvester 100 and one or more receiving machines 200 operating at a worksite during a harvesting operation. Agricultural system 400, as illustrated in FIG. 1 includes agricultural harvester 100, one or more receiving vehicles 200, and one or more remote computing systems 300. FIG. 1 shows that a receiving machine 200 can be in the form of a tractor 160 and towed grain cart 162 or in the form of a truck (e.g., semi-truck) 180 and a towed trailer (e.g., semi-trailer) 182. While the example in FIG. 1 illustrates agricultural harvester 100 as a combine harvester that is performing a material transfer operation with a receiving machine 200 that travels alongside the combine harvester, in other examples, agricultural harvester 100 could be a forage harvester that performs a material transfer operation with a receiving machine that travels alongside or behind the forage harvester.

Agricultural harvester 100, in the illustrated example, includes a header 101, an operator compartment 103, ground engaging elements 105 (e.g., wheels or tracks), communication system 106, chute 107 and spout 109, a grain bin 111, and a power plant 113 (e.g., internal combustion engine, battery and electric motors, etc.). Communication system 106 can include, among other things, a wireless transmitter and wireless receiver for wirelessly communicating with other components of agricultural system 400, such as receiving vehicles 200, and remote computing systems 300. Chute 107 and spout 109 are parts of a material transfer subsystem 154 (shown in FIG. 2) which can also include an auger or blower (not shown) for conveying harvested material from grain bin 111 through chute 107 and spout 109 to a receiving vehicle 200. Material transfer subsystem 154 can also include one or more actuators for driving movement of chute 107, spout 109, and the auger or blower. The chute is extendable and retractable within a range of angular rotation such as between deployed angular positions (shown in FIG. 1) and a storage position. Agricultural harvester 100 can include various other components as well, some of which will be described below.

Tractor 160, as illustrated, includes a power plant 163 (e.g., internal combustion engine, battery and electric motors, etc.), ground engaging elements 165 (e.g., wheels or tracks), an operator compartment 167, and a communication system 206-1. Communication system 206-1 can include, among other things, a wireless transmitter and wireless receiver for wirelessly communicating with other components of agricultural system 400, such as agricultural harvester 100, other receiving vehicles 200, and remote computing systems 300. Grain cart 162 is coupled to tractor 160 by way of a hitch assembly, and, as illustrated, includes ground engaging elements 170, grain bin 172 which includes a volume 174 for receiving material, such as harvested crop material from agricultural harvester 100.

Truck 180, as illustrated, includes a power plant 183 (e.g., internal combustion engine, battery and electric motors, etc.), ground engaging elements 185 (e.g., wheels or tracks), an operator compartment 187, and a communication system 206-2. Communication system 206-2 can include, among other things, a wireless transmitter and wireless receiver for wirelessly communicating with other components of agricultural system 400, such as agricultural harvester 100, other receiving vehicles 200, and remote computing systems 300. Trailer 182 is coupled to truck 180 by way of a hitch assembly, and, as illustrated, includes ground engaging elements 190, grain bin 192 which includes a volume 194 for receiving material, such as harvested crop material from agricultural harvester 100.

Receiving vehicles 200 can include various other components as well, some of which will be described below.

The operator compartments 103, 167, and 187 can include one or more operator interface mechanisms that allow an operator to control and manipulate the respective machine. The operator interface mechanisms can be any of a wide variety of different types of mechanisms. For instance, they can include one or more input mechanisms such as steering wheels, levers, joysticks, buttons, pedals, switches, etc. In addition, operator compartment 103, 167, and 187 can include one or more operator interface display devices, such as monitors, or mobile devices that are supported within the operator compartment. The operator interface mechanisms can also include one or more user actuatable elements displayed on the display devices, such as icons, links, buttons, etc. The operator interface mechanisms can include one or more microphones where speech recognition is provided on the respective machine. They can also include one or more audio interface mechanisms (such as speakers), one or more haptic interface mechanisms or a wide variety of other operator interface mechanisms. The operator interface mechanisms can include other output mechanisms as well, such as dials, gauges, meter outputs, lights, audible or visual alerts or haptic outputs, etc.

During a harvesting operation, and by way of overview, the height of header 101 is set and agricultural harvester 100 illustratively moves over a worksite (field) in the direction indicated by arrow 195. As agricultural harvester 100 moves, header 101 engages the crop to be harvested and gather it towards a cutter (not shown). After it is cut, the crop can be engaged by a reel that moves the crop to a feeding system. The feeding system move the crop to the center of header 101 and then through a center feeding system in a feeder house (not shown) toward a feed accelerator, which accelerates the crop into a thresher (not shown). The crop is then threshed by a rotor rotating the crop against concaves (not shown). The threshed crop is moved by a separator rotor in a separator where some of the residue is moved by a discharge beater toward a residue subsystem. It can be chopped by a residue chopper and spread on the worksite by a spreader. In other implementations, the residue is simply dropped in a windrow, instead of being chopped and spread.

Grain falls to a cleaning shoe (or cleaning subsystem). A chaffer separates some of the larger material from the grain, and a sieve separates some of the finer material from the clean grain. Clean grain falls to an auger in a clean grain elevator, which moves the clean grain upward and deposits it in grain tank 111. Residue can be removed from the cleaning shoe by airflow generated by a cleaning fan. That residue can also be moved rearwardly in agricultural harvester 100 toward the residue handling subsystem.

Tailings can be moved by a tailing elevator back to the thresher where they can be re-threshed. Alternatively, the tailings can also be passed to a separate re-threshing mechanism (also using a tailings elevator or another transport mechanism) where they can re-threshed as well.

During operation, the agricultural harvester 100 performs one or more material transport operations whereby the material transport subsystem on agricultural harvester 100 is operated to transfer harvested material (grain) from grain bin 111 to a grain bin on a receiving vehicle 200. The chute 107 and spout 109 are positioned outwardly from a stored position and the auger or blower is operated to convey harvested material through the chute 107 and spout 109 to be received by the grain bin of the receiving vehicle 200. Ideally, the operation of the harvester 100 is not imposed upon any more than controlling the material transfer subsystem to initiate and material transfer operation, that is, ideally, the agricultural harvester 100 can continue to operate at its desired speed and desired heading during the material transfer operation. A receiving machine 200 will travel to and then alongside agricultural harvester 100 and will attempt to match its speed with the speed of agricultural harvester 100. The receiving machine 200 will, at various points throughout the material transfer operation, temporarily increase its speed (accelerate) or temporarily decrease its speed (decelerate) to adjust its relative fore-to-aft positioning relative to the agricultural harvester to fill the grain cart according to a fill strategy (e.g., front-to-back filling or back-to-front filling, etc.). The receiving machine 200 will also control its steering to maintain a lateral distance from agricultural harvester such that harvested material conveyed through spout 109 will land in the grain bin of the receiving machine 200. When the grain bin 111 of harvester 100 has been emptied to a sufficient level, or when the grain bin of the receiving machine is filled to a sufficient level, or when some other limiting factor is met, the material transfer operation will end. This operation can be repeated multiple times throughout a harvesting operation and by one or more receiving vehicles 200. While the tractor 160 and grain cart 162 are shown as operating in tandem with the harvester 100 during a material transfer operation, in other examples, the truck 180 and trailer 182 can operated in tandem with harvester 100 during a material transfer operation.

Figure 2:
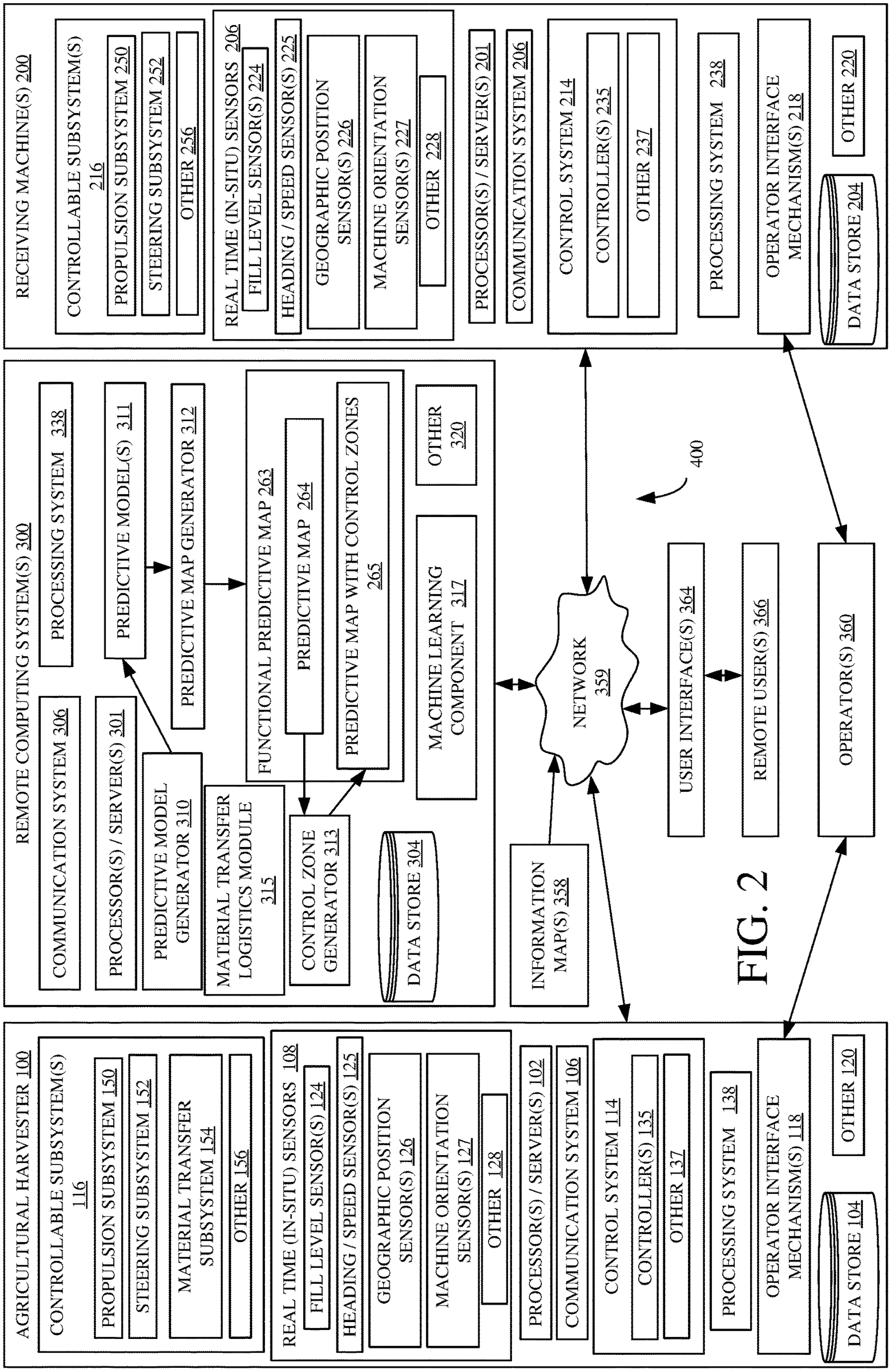
FIG. 2 is a block diagram showing some portions of an agricultural system, including an agricultural harvester and receiving machine(s), in more detail, according to some examples of the present disclosure.

FIG. 2 is a block diagram of agricultural system 400 in more detail. FIG. 2 shows that agricultural system 400 includes agricultural harvester 100, one or more receiving machines 200, one or more remote computing systems 300, one or more operators 360, one or more remote users 366, one or more remote user interfaces 364, network 359, and one or more information maps 358. Agricultural harvester 100, itself, illustratively includes one or more processors or servers 102, data store 104, communication system 106, one or more in-situ sensors 108 that sensor one or more characteristics at a worksite concurrent with an operation, control system 114, one or more controllable subsystems 116, one or more operator interface mechanisms 118, processing system 138 that processes the sensor signals generated by in-situ sensors 108 to generated processed sensor data, and can include various other items and functionality 120 as well. In-situ sensors 108 can include fill level sensors 124, heading/speed sensors 125, geographic position sensors 126, machine orientation sensors 127, and can include various other sensors 128 as well. The in-situ sensors 108 generate values corresponding to sensed characteristics. The information generated by in-situ sensors 108 can be communicated to receiving vehicles 200 and to remote computing systems 300. The information generated by in-situ sensors 108 can be georeferenced to areas of the worksite based on geographic location data provided by geographic position sensor 226. Control system 114, itself, can include one or more controllers 135 for controlling various other items of agricultural harvester 100, and can include other items 137 as well. Controllable subsystems 116 can include propulsion subsystem 150, steering subsystem 152, material transfer subsystem 154, and can include various other subsystems 156 as well.

Receiving machines 200, themselves, illustratively include one or more processors or servers 202, data store 204, communication system 206, one or more in-situ sensors 208 that sensor one or more characteristics at a worksite concurrent with an operation, control system 214, one or more controllable subsystems 216, one or more operator interface mechanisms 218, processing system 238 that processes the sensor signals generated by in-situ sensors 208 to generate processed sensor data, and can include various other items and functionality 220 as well. In-situ sensors 208 can include fill level sensors 224, heading/speed sensors 225, geographic position sensors 226, machine orientation sensors 227, and can include various other sensors 228 as well. The in-situ sensors 208 generate values corresponding to sensed characteristics. The information generated by in-situ sensors 208 can be communicated to other receiving vehicles 200, agricultural harvester 100, and to remote computing systems 300. The information generated by in-situ sensors 208 can be georeferenced to areas of the worksite based on geographic location data provided by geographic position sensor 226. Control system 214, itself, can include one or more controllers 235 for controlling various other items of agricultural harvester 100, and can include other items 237 as well. Controllable subsystems

216 can include propulsion subsystem 250, steering subsystem 252, and can include various other subsystems 256 as well.

Remote computing systems 300, as illustrated, include one or more processors or servers 301, data store 304, communication system 306, predictive model or relationship generator (collectively referred to herein as "predictive model generator 310"), predictive map generator 312, control zone generator 313, material transfer logistics module 315, machine learning component 317, processing system 338 which can process sensor signals generated by in-situ sensors 108 or 208, or both, to generate processed sensor data, and can include various other items and functionality 320.

Fill level sensors 124 sense a characteristic indicative of a fill level of grain bin 111. Fill level sensors 124 can be an imaging system, such as a stereo camera, that observes clean grain tank 111 and detects a fill level of material within the grain tank 111. The images generated by the imaging system can be processed, such as by processing system 138 or processing system 338, using suitable imaging processing, to generate a value indicative of the fill level of the grain tank 111. The imaging system can be mounted to the exterior side of the roof of the operator compartment 103, to the grain bin, or to other suitable locations on agricultural harvester 100. Fill level sensors 124 can include one or more electromagnetic radiation (ER) sensors that transmit and/or receive electromagnetic radiation (ER) to detect presence of material. For instance, one or more ER sensors can be placed within grain tank 111 at a given distance from a perimeter of the grain tank 111 or mounted to observe the interior of grain tank 111 to detect when the grain pile in the grain tank 111 has reached a given height. Fill level sensors 124 can include one or more mass sensors (such as a strain gauge, pressure sensor, etc.) disposed within grain tank 111 or between grain tank 111 and another component (e.g., an axle) of agricultural harvester 100. The mass sensors sense a mass of the material within grain tank 111 which can be used to derive a fill level of the grain tank 111. Fill level sensors 124 can also include one or more mass flow sensors that measure an amount of material entering grain tank 111. For instance, a mass flow sensor that sensed mass flow of grain through the clean grain elevator of the agricultural harvester 100. Fill level sensors 124 can also include one or more contact sensors disposed within the grain tank 111, for instance a contact pad that detects contact with grain, or a contact member that is displaced by contact with the grain. Various other types of fill level sensors are also contemplated herein.

Heading/speed sensors 125 detect a heading and speed characteristics (e.g., travel speed, acceleration, deceleration, etc.) at which mobile machine 100 is traversing the worksite during the operation. This can include sensors that sense the movement (e.g., rotation) of ground-engaging elements (e.g., wheels or tracks 105), or components coupled to the ground engaging elements, or can utilize signals received from other sources, such as geographic position sensor 126, thus, while heading/speed sensors 125 as described herein are shown as separate from geographic position sensor 126, in some examples, machine heading/speed is derived from signals received from geographic position sensor 126 and subsequent processing. In other examples, heading/speed sensors 125 are separate sensors and do not utilize signals received from other sources.

Geographic position sensor 126 illustratively senses or detects the geographic position or location of agricultural harvester 100. Geographic position sensor 126 can include, but is not limited to, a global navigation satellite system (GNSS) receiver that receives signals from a GNSS satellite transmitter. Geographic position sensor 126 can also include a real-time kinematic (RTK) component that is configured to enhance the precision of position data derived from the GNSS signal. Geographic position sensor 126 can include a dead reckoning system, a cellular triangulation system, or any of a variety of other geographic position sensors.

Machine orientation sensors 127 can include one or more inertial measurement units (IMUs) which can provide orientation information relative to mobile machine 100, such as pitch, roll, and yaw data of mobile machine 100. The one or more IMUs can include accelerometers, gyroscopes, and magnetometers.

In-situ sensors 108 can also include various other types of sensors 128, such as a feedrate controller output sensor that generates sensor signals indicative of the control outputs from a feedrate controller of controllers 135. The control signals may be speed control signals or other control signals that are applied to controllable subsystems 116 to control feedrate of material through agricultural harvester 100.

Processing system 138 or processing system 338 processes the sensor signals generated by in-situ sensors 108 to generate processed sensor data indicative of one or more characteristics. For example, processing system 138 or 338 generates processed sensor data indicative of characteristic values based on the sensor signals generated by in-situ sensors 108, such as fill level values based on sensor signals generated by fill level sensors 124, machine speed values (e.g., travel speed values, acceleration values, and/or deceleration values) based on sensor signals generated by heading/speed sensors 125 or geographic position sensor 126, machine heading values based on sensor signals generated by heading/speed sensors 125 or geographic position sensor 126, geographic position values based on sensor signals generated by geographic position sensor 126, machine orientation values (e.g., pitch, roll, and/or yaw) based on sensors signals generated by machine orientation sensors 127, as well as various other values based on sensors signals generated by various other in-situ sensors 128.

It will be understood that processing system 138 or 338 can be implemented by one or more processers or servers, such as processors or servers 101 or processors or servers 301, respectively. Additionally, processing system 138 and processing system 338 can utilize various sensor signal filtering techniques, noise filtering techniques, sensor signal categorization, aggregation, normalization, as well as various other processing functionality. Similarly, processing system 138 and processing system 338 can utilize various image processing techniques such as, sequential image comparison, RGB, edge detection, black/white analysis, machine learning, neural networks, pixel testing, pixel clustering, shape detection, as well any number of other suitable image processing and data extraction functionality.

Fill level sensors 224 sense a characteristic indicative of a fill level of a grain bin of the respective receiving machine 200 (e.g., grain bin 172 or 192). Fill level sensors 224 can be an imaging system, such as a stereo camera, that observes the grain bin of the respective receiving vehicle and detects a fill level of material within the grain bin. The images generated by the imaging system can be processed, such as by processing system 238 or processing system 338, using suitable imaging processing, to generate a value indicative of the fill level of the respective grain bin. The imaging system can be mounted to the exterior side of the roof of the operator compartment of the respective receiving vehicle (e.g., exterior side of the roof of operator compartment 167 or operator compartment 187), to the respective grain bin, or to other suitable locations on the respective receiving machine. Fill level sensors 224 can include one or more electromagnetic radiation (ER) sensors that transmit and/or receive electromagnetic radiation (ER) to detect presence of material. For instance, one or more ER sensors can be placed within the respective grain bin at a given distance from a perimeter of the grain bin or mounted to observe the interior of the grain bin to detect when the grain pile in the grain bin has reached a given height. Fill level sensors 224 can include one or more mass sensors (such as a strain gauge, pressure sensor, etc.) disposed within the grain bin, between the grain bin and another component (e.g., an axle) of the receiving machine 200, and/or in the hitch assembly of the receiving vehicle 200. The mass sensors sense a mass of the material within the grain bin which can be used to derive a fill level of the grain bin. Fill level sensors 224 can also include one or more contact sensors disposed within the grain tank 111, for instance a contact pad that detects contact with grain, or a contact member that is displaced by contact with the grain. Various other types of fill level sensors are also contemplated herein.

In some examples, the fill level of the grain bin of the receiving machine is derived from sensors disposed on the agricultural harvester 100. For instance, an imaging system, such as a stereo camera can be mounted on the agricultural harvester (e.g., on the chute 107) and can be disposed to view the grain bin of the receiving vehicle during a material transfer operation. In another example, the agricultural harvester can include a mass flow sensor that senses a mass flow of material through the chute 107 which can be used to derive a fill level of the grain bin of the receiving machine 200. In another example, the agricultural harvester can include a senser that senses a speed of the auger or chute of the material transfer subsystem to derive flow rate of material to derive a fill level of the grain bin of the receiving machine 200. The sensor signals generated by the sensors on the agricultural harvester (or the processed sensor data) can be communicated to the remote computing systems 300 or to the receiving machines 200, or both.

Heading/speed sensors 225 detect a heading and speed characteristics (e.g., travel speed, acceleration, deceleration, etc.) at which the respective receiving machine 200 is traversing the worksite during the operation. This can include sensors that sense the movement (e.g., rotation) of ground-engaging elements (e.g., wheels or tracks 165, 170, 185, and/or 190), or components coupled to the ground engaging elements, or can utilize signals received from other sources, such as geographic position sensor 226, thus, while heading/speed sensors 225 as described herein are shown as separate from geographic position sensor 226, in some examples, machine heading/speed is derived from signals received from geographic position sensor 226 and subsequent processing. In other examples, heading/speed sensors 225 are separate sensors and do not utilize signals received from other sources.

Geographic position sensor 226 illustratively senses or detects the geographic position or location of the respective receiving machine 200. Geographic position sensor 226 can include, but is not limited to, a global navigation satellite system (GNSS) receiver that receives signals from a GNSS satellite transmitter. Geographic position sensor 226 can also include a real-time kinematic (RTK) component that is configured to enhance the precision of position data derived from the GNSS signal. Geographic position sensor 226 can include a dead reckoning system, a cellular triangulation system, or any of a variety of other geographic position sensors.

Machine orientation sensors 227 can include one or more inertial measurement units (IMUs) which can provide orientation information relative to the respective receiving vehicle 200, such as pitch, roll, and yaw data of the respective receiving vehicle 200. The one or more IMUs can include accelerometers, gyroscopes, and magnetometers.

Processing system 238 or processing system 338 processes the sensor signals generated by in-situ sensors 208 to generate processed sensor data indicative of one or more characteristics. For example, processing system 238 or 338 generates processed sensor data indicative of characteristic values based on the sensor signals generated by in-situ sensors 208, such as fill level values based on sensor signals generated by fill level sensors 224, machine speed values (e.g., travel speed values, acceleration values, and/or deceleration values) based on sensor signals generated by heading/speed sensors 225 or geographic position sensor 226, machine heading values based on sensor signals generated by heading/speed sensors 125 or geographic position sensor 226, geographic position values based on sensor signals generated by geographic position sensor 226, machine orientation values (e.g., pitch, roll, and/or yaw) based on sensors signals generated by machine orientation sensors 227, as well as various other values based on sensors signals generated by various other in-situ sensors 228.

It will be understood that processing system 238 can be implemented by one or more processers or servers, such as processors or servers 201. Additionally, processing system 238 can utilize various sensor signal filtering techniques, noise filtering techniques, sensor signal categorization, aggregation, normalization, as well as various other processing functionality. Similarly, processing system 238 can utilize various image processing techniques such as, sequential image comparison, RGB, edge detection, black/white analysis, machine learning, neural networks, pixel testing, pixel clustering, shape detection, as well any number of other suitable image processing and data extraction functionality.

Control system 114 can include a variety of controllers 135, such as a communication system controller to control communication system 106, a propulsion controller to control propulsion subsystem 150 to control a travel speed, acceleration, and/or deceleration of agricultural harvester 100, a path planning controller to control steering subsystem 152 to control the heading of agricultural harvester 100, and a material transfer controller to control material transfer subsystem 154, to initiate or end a material transfer operation, to control the position of chute 107 and/or spout 109, to control the actuation (speed) of the auger or blower. Controllers 135 can also include an operator interface controller to control operator interface mechanisms 118 to provide indications, such as displays, alerts, notifications, as well as various other outputs. Controllers 135 can also include a feedrate controller that generates control signals to control feedrate of material through agricultural harvester 100. For example, the feedrate controller can generate speed control signals to control propulsion subsystem 150 to accelerate or decelerate the agricultural harvester to reach a commanded travel speed to maintain a feedrate of material through agricultural harvester 100. Some examples of the different types of controllers 135 will be shown in FIG. 5.

Control system 214 can include a variety of controllers 235, such as a communication system controller to control communication system 206, a propulsion controller to control propulsion subsystem 250 to control a travel speed, acceleration, and/or deceleration of the respective receiving vehicle 200, and a path planning controller to control steering subsystem 252 to control the heading of the respective receiving vehicle 200. Controllers 235 can also include an operator interface controller to control operator interface mechanisms 218 to provide indications, such as displays, alerts, notifications, as well as various other outputs. Some examples of the different types of controllers 235 will be shown in FIG. 5.

Communication system 106 is used to communicate between components of agricultural harvester 100 or with other items of agricultural system 400, such as remote computing systems 300 and/or receiving machines 200. Communication system 106 can include one or more of wired communication circuitry and wireless communication circuitry, as well as wired and wireless communication components. In some examples, communication system 106 can be a cellular communication system, a system for communicating over a wide area network or a local area network, a system for communicating over a controller area network (CAN), such as a CAN bus, a system for communication over a near field communication network, or a communication system configured to communicate over any of a variety of other networks. Communication system 106 can also include a system that facilitates downloads or transfers of information to and from a secure digital (SD) card or a universal serial bus (USB) card, or both. Communication system can utilize network 359. Network 359 can be any of a wide variety of different types of networks such as the Internet, a cellular network, a wide area network (WAN), a local area network (LAN), a controller area network (CAN), a near-field communication network, or any of a wide variety of other networks or communication systems.

Communication system 206 is used to communicate between components of the respective receiving machine or with other items of agricultural system 400, such as remote computing systems 300, other receiving machines 200, and/or agricultural harvester 100. Communication system 206 can include one or more of wired communication circuitry and wireless communication circuitry, as well as wired and wireless communication components. In some examples, communication system 206 can be a cellular communication system, a system for communicating over a wide area network or a local area network, a system for communicating over a controller area network (CAN), such as a CAN bus, a system for communication over a near field communication network, or a communication system configured to communicate over any of a variety of other networks. Communication system 206 can also include a system that facilitates downloads or transfers of information to and from a secure digital (SD) card or a universal serial bus (USB) card, or both. Communication system 206 can utilize network 359.

Communication system 306 is used to communicate between components of the remote computing system 300 or with other items of agricultural system 400, such as remote receiving machines 200 and/or agricultural harvester 100. Communication system 306 can include one or more of wired communication circuitry and wireless communication circuitry, as well as wired and wireless communication components. In some examples, communication system 306 can be a cellular communication system, a system for communicating over a wide area network or a local area network, a system for communicating over a controller area network (CAN), such as a CAN bus, a system for communication over a near field communication network, or a communication system configured to communicate over any of a variety of other networks. Communication system 306 can also include a system that facilitates downloads or transfers of information to and from a secure digital (SD) card or a universal serial bus (USB) card, or both. In communicating with other items of agricultural system 400, communication system can utilize network 359.

FIG. 2 also shows remote users 366 interacting with agricultural harvester 100, receiving machines 200, and/or remote computing systems 300 through user interfaces mechanisms 364 over network 359.

FIG. 2 also shows that one or more operators 360 may operate agricultural harvester 100 and receiving machines 200. The operators 360 interact with operator interface mechanisms 118 and 218. In some examples, operator interface mechanisms 118 and 218 may include joysticks, levers, a steering wheel, linkages, pedals, buttons, dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, the operators 360 may interact with operator interface mechanisms 118 and 218 using touch gestures. These examples described above are provided as illustrative examples and are not intended to limit the scope of the present disclosure. Consequently, other types of operator interface mechanisms 118 and 218 may be used and are within the scope of the present disclosure.

Remote computing systems 300 can be a wide variety of different types of systems, or combinations thereof. For example, remote computing systems 300 can be in a remote server environment. Further, remote computing systems 300 can be remote computing systems, such as mobile devices, a remote network, a farm manager system, a vendor system, or a wide variety of other remote systems. In one example, agricultural harvester 100 or receiving machines 200, or both, can be controlled remotely by remote computing systems 300 or by remote users 366, or both. As will be described below, in some examples, one or more of the components shown in FIG. 2 as being disposed on agricultural harvester 100 or on receiving machines 200 can be located elsewhere, such as at remote computing systems 368. Similarly, in some examples, one or more of the components shown in FIG. 2 as being disposed on remote computing systems 300 can be located elsewhere, such as on agricultural harvester 100 or receiving machines 200, or both.

FIG. 2 also shows that agricultural system 400 can obtain one or more information maps 358. As described herein, the information maps 358 include, for example, one or more of a vegetative index map, a predictive yield map, a biomass map, a crop state map, a topographic map, a soil property map, a seeding map, and a prescribed speed map. However, information maps 358 may also encompass other types of data, such as other types of data that were obtained prior to a harvesting operation or a map from a prior operation. In other examples, information maps 358 can be generated during a current operation, such a map generated by predictive map generator 312 based on a predictive model 311 generated by predictive model generator 310.

Information maps 358 may be downloaded over network 359 and stored in a data store, such as data store 302, using a communication system, such as communication system 306, or in other ways.

Predictive model generator 310 generates a predictive model or relationship (collectively referred to hereinafter as "predictive model 311") that is indicative of a relationship between the values sensed by the in-situ sensors 108 or derived from sensor signals generated by in-situ sensors 108 and a values mapped to the worksite by the information maps 358. As an illustrative example, if the information map 358 maps a vegetative index value to different locations in the worksite, and the in-situ sensor 108 is sensing a value indicative of a speed characteristic of agricultural harvester 100, then model generator 310 generates a predictive speed model that models the relationship between the vegetative index value and the speed characteristic values.

In some examples, the predictive map generator 312 uses the predictive models 311 generated by predictive model generator 310 to generate functional predictive maps 263 that predict the value of a characteristic, such as agricultural harvester speed characteristics, sensed by the in-situ sensors 108 at different locations in the worksite based upon one or more of the information maps 358. For example, where the predictive model 311 is a predictive speed model that models a relationship between speed characteristics sensed by in-situ sensors 308 and vegetative index values from a vegetative index map, then predictive map generator 312 generates a functional predictive speed map that predicts speed characteristic values at different locations at the worksite field based on the mapped vegetative index values at those locations and the predictive speed model.

In some examples, the type of values in the functional predictive map 263 may be the same as the in-situ data type sensed by the in-situ sensors 108. In some instances, the type of values in the functional predictive map 263 may have different units from the data sensed by the in-situ sensors 108. In some examples, the type of values in the functional predictive map 263 may be different from the data type sensed by the in-situ sensors 108 but have a relationship to the type of data type sensed by the in-situ sensors 108. For example, in some examples, the data type sensed by the in-situ sensors 108 may be indicative of the type of values in the functional predictive map 263. In some examples, the type of data in the functional predictive map 263 may be different than the data type in the information maps 358. In some instances, the type of data in the functional predictive map 263 may have different units from the data in the information maps 358. In some examples, the type of data in the functional predictive map 263 may be different from the data type in the information map 358 but has a relationship to the data type in the information map 358. For example, in some examples, the data type in the information maps 358 may be indicative of the type of data in the functional predictive map 263. In some examples, the type of data in the functional predictive map 263 is different than one of, or both of, the in-situ data type sensed by the in-situ sensors 108 and the data type in the information maps 358. In some examples, the type of data in the functional predictive map 263 is the same as one of, or both of, of the in-situ data type sensed by the in-situ sensors 108 and the data type in information maps 358. In some examples, the type of data in the functional predictive map 263 is the same as one of the in-situ data type sensed by the in-situ sensors 108 or the data type in the information maps 358, and different than the other.

Continuing with the preceding example, in which prior information map 358 is a vegetative index map and in-situ sensor 108 senses a value indicative of a speed characteristic (e.g., travel speed, acceleration, deceleration, etc.), predictive map generator 312 can use the vegetative index values in prior information map 358, and the predictive model 311 generated by predictive model generator 310, to generate a functional predictive map 263 that predicts the speed characteristic value at different locations in the worksite. Predictive map generator 312 thus outputs predictive map 264.

As shown in FIG. 2, predictive map 264 predicts the value of a sensed characteristic (sensed by in-situ sensors 108), or a characteristic related to the sensed characteristic, at various locations across the worksite based upon one or more information values in one or more information maps 358 at those locations and using the predictive model(s) 311. For example, if predictive model generator 310 has generated a predictive model 311 indicative of a relationship between biomass values and speed characteristic values, then, given the biomass value at different locations across the worksite, predictive map generator 312 generates a predictive map 264 that predicts speed characteristic values at different locations across the worksite. The biomass value, obtained from the biomass map, at those locations and the relationship between biomass values and speed characteristic values, obtained from the predictive model 311, are used to generate the predictive map 264. This is merely one example.

Some variations in the data types that are mapped in the information maps 358, the data types sensed by in-situ sensors 108, and the data types predicted on the predictive map 264 will now be described.

In some examples, the data type in one or more information maps 358 is different from the data type sensed by in-situ sensors 108, yet the data type in the predictive map 264 is the same as the data type sensed by the in-situ sensors 108. For instance, the information map 358 may be a topographic map, and the variable sensed by the in-situ sensors 308 may be a speed characteristic value. The predictive map 264 may then be a predictive speed map that maps predicted speed characteristic values to different geographic locations in the in the worksite.

Also, in some examples, the data type in the information map 358 is different from the data type sensed by in-situ sensors 108, and the data type in the predictive map 264 is different from both the data type in the prior information map 358 and the data type sensed by the in-situ sensors 108.

In some examples, the information map 358 is from a prior pass through the field during a prior operation and the data type is different from the data type sensed by in-situ sensors 108, yet the data type in the predictive map 264 is the same as the data type sensed by the in-situ sensors 108. For instance, the information map 358 may be a seeding map generated during a previous operation on the worksite, and the variable sensed by the in-situ sensors 108 may be a speed characteristic value. The predictive map 264 may then be a predictive speed map that maps predicted speed characteristic values to different geographic locations in the worksite.

In some examples, the information map 358 is from a prior pass through the field during a prior operation and the data type is the same as the data type sensed by in-situ sensors 108, and the data type in the predictive map 264 is also the same as the data type sensed by the in-situ sensors 108. For instance, the information map 358 may be a speed map generated during a previous year, and the variable sensed by the in-situ sensors 108 may be a speed characteristic value. The predictive map 264 may then be a predictive speed map that maps predicted speed characteristic values to different geographic locations in the field. In such an example, the relative speed characteristic value differences in the georeferenced information map 358 from the prior year can be used by predictive model generator 310 to generate a predictive model that models a relationship between the relative speed characteristic value differences on the information map 358 and the material speed characteristic values sensed by in-situ sensors 108 during the current operation. The predictive model is then used by predictive map generator 310 to generate a predictive speed map.

In another example, the prior information map 258 may be a map generated during a prior operation in the same year and the data type is different from the data type sensed by the in-situ sensors 108, and the data type in the predictive map 264 is also the same as the data type sensed by the in-situ sensors 108. For instance, the information map 358 may be a topographic map, and the variable sensed by the in-situ sensors 108 during the current harvesting operation may be a speed characteristic value. The predictive map 264 may then be a predictive speed map that maps predicted speed characteristic values to different geographic locations in the worksite. In such an example, a map of the topographic values at time of the prior operation is geo-referenced recorded and provided to remote computing systems 300 as an information map 358 of topographic values. In-situ sensors 108 during a current harvesting operation can detect machine speed characteristic values at geographic locations in the worksite and predictive model generator 310 may then build a predictive model that models a relationship between machine speed characteristic values at time of the current harvesting operation and topographic values at the time of the prior operation. This is because the topographic values at the time of the prior operation in the same year are likely to be the same as at the time of the current harvesting operation or may be more accurate than the topographic values for the worksite provided in other ways.

In some examples, predictive map 264 can be provided to the control zone generator 313. Control zone generator 313 groups adjacent portions of an area into one or more control zones based on data values of predictive map 264 that are associated with those adjacent portions. A control zone may include two or more contiguous portions of a worksite, such as a field, for which a control parameter corresponding to the control zone for controlling a controllable subsystem is constant. For example, a response time to alter a setting of controllable subsystems may be inadequate to satisfactorily respond to changes in values contained in a map, such as predictive map 264. In that case, control zone generator 313 parses the map and identifies control zones that are of a defined size to accommodate the response time of the controllable subsystems. In another example, control zones may be sized to reduce wear from excessive actuator movement resulting from continuous adjustment. In some examples, there may be a different set of control zones for each controllable subsystem or for groups of controllable subsystems. The control zones may be added to the predictive map 264 to obtain predictive control zone map 265. Predictive control zone map 265 can thus be similar to predictive map 264 except that predictive control zone map 265 includes control zone information defining the control zones. Thus, a functional predictive map 263, as described herein, may or may not include control zones. Both predictive map 264 and predictive control zone map 265 are functional predictive maps 263. In one example, a functional predictive map 263 does not include control zones, such as predictive map 264. In another example, a functional predictive map 263 does include control zones, such as predictive control zone map 265. In some examples, multiple crops may be simultaneously present in a field if an intercrop production system is implemented. In that case, predictive map generator 312 and control zone generator 313 are able to identify the location and characteristics of the two or more crops and then generate predictive map 264 and predictive map with control zones 265 accordingly.

It will also be appreciated that control zone generator 313 can cluster values to generate control zones and the control zones can be added to predictive control zone map 265, or a separate map, showing only the control zones that are generated. In some examples, the control zones may be used for controlling or calibrating agricultural harvester 100 or receiving machines 200, or both. In other examples, the control zones may be presented to an operator 360 and used to control or calibrate agricultural harvester 100 or receiving machines 200, or both, and, in other examples, the control zones may be presented to an operator 360 or another user, such as a remote user 366, or stored for later use.

Predictive map 264 or predictive control zone map 265 or both are provided to control system 114, which generates control signals based upon the predictive map 264 or predictive control zone map 265 or both to control agricultural harvester 100. Predictive map 264 or predictive control zone map 265 or both are provided to control system 214, which generates control signals based upon the predictive map 264 or predictive control zone map 265 or both to control the respective receiving machine 200.

While the illustrated example of FIG. 2 shows that various components of agricultural system architecture 400 are located at specific locations, it will be understood that in other examples one or more of the components illustrated as being located at one location in FIG. 2 can be located at other locations. For example, one or more of predictive model generator 310, predictive model 311, predictive map generator 312, functional predictive maps 263 (e.g., 264 and 265), and control zone generator 313 can be located on agricultural harvester 100 or receiving machines 200, or both, but can communicate with other items of agricultural system 400 over network 359. Thus, the predictive models 311 and functional predictive maps 263 may be generated locally at agricultural harvester 100 or receiving machines 200 and communicated to other items in agricultural system 400. In other examples, agricultural harvester 100 or receiving machines 200 may access the predictive models 311 and functional predictive maps 263 at the remote locations without downloading the predictive models 311 and functional predictive maps 263. In other examples, material transfer logistics module 315 may be located on agricultural harvester 100 or on receiving machine 200, or both. In other examples, one or more of control system 114 and control system 214, or components thereof, can be located at remote computing systems 300. In another example, remote computing systems 300 can include a control system or a control value generator that communicates control commands to one or more of agricultural harvester 100 and receiving machines 200 which are then used by the local control system of the agricultural harvester and/or the receiving machines 200. These are merely some examples of the ways in which the agricultural system 400 can be distributed. Thus, it will be understood that the items in agricultural system 400 can be distributed in various ways, including ways that differ from the example shown in FIG. 2.

Figure 3:
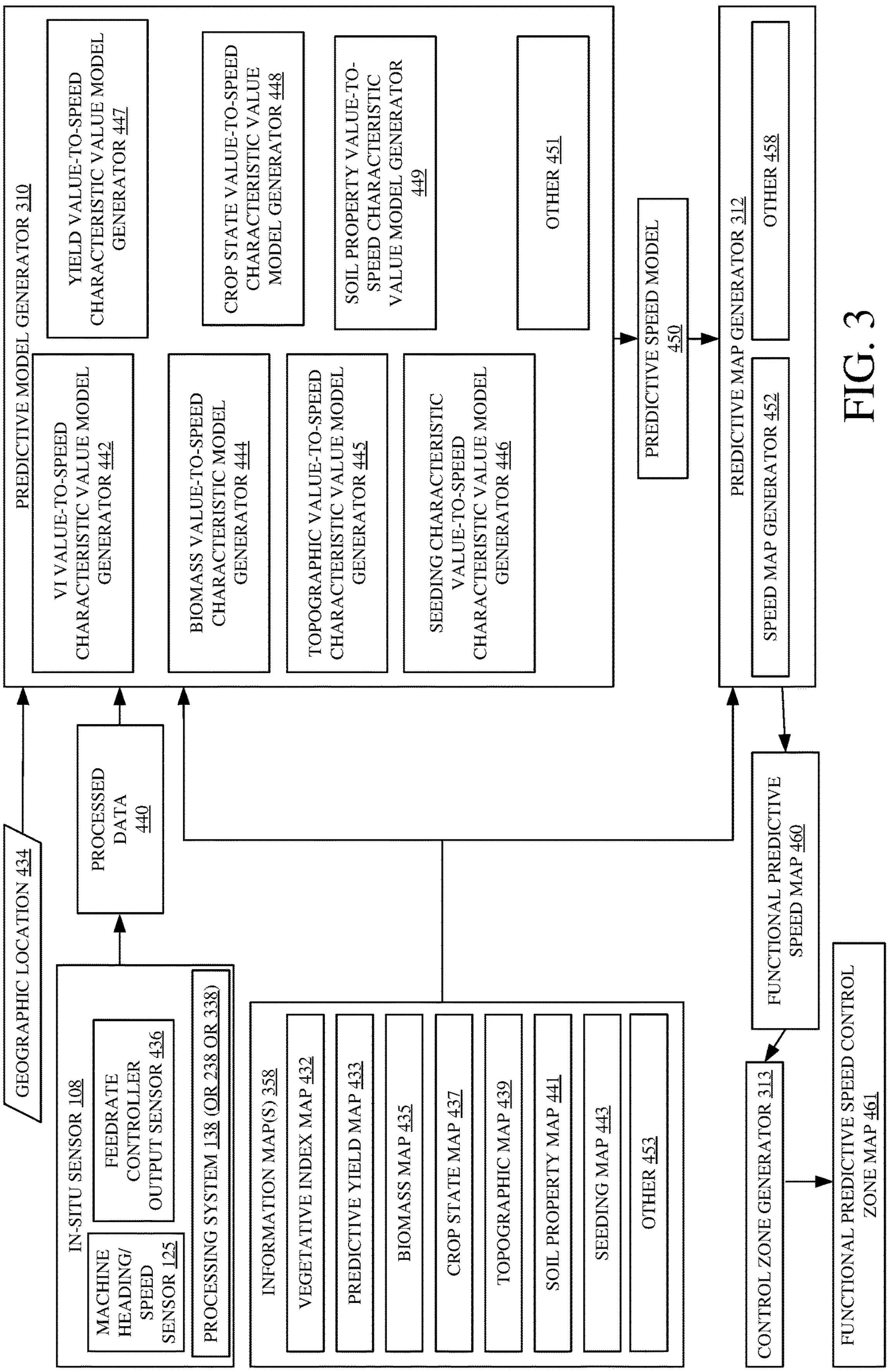
FIG. 3 is a block diagram showing one example of a predictive model generator and predictive map generator.

FIG. 3 is a block diagram of a portion of the agricultural system architecture 400 shown in FIG. 2. Particularly, FIG. 3 shows, among other things, examples of the predictive model generator 310 and the predictive map generator 312 in more detail. FIG. 3 also illustrates information flow among the various components shown. The predictive model generator 310 receives one or more information map(s) 358. In the example illustrated in FIG. 3, information maps 358 include one or more of a vegetative index map 432, a predictive yield map 433, a biomass map 435, a crop state map 437, a topographic map 439, a soil property map 441, a seeding map 443 or any of a wide variety of other maps 453. Predictive model generator 310 also receives a geographic location 434, or an indication of a geographic location, from geographic position sensor 126. In-situ sensors 108 illustratively include machine heading/speed sensors 125 or a feedrate controller output sensor 436 that sense an output from a feedrate controller of agricultural harvester 100, or both, as well as a processing system 138. Processing system 138 processes sensor data generated from header/speed sensor 125 or from sensor 436, or both, to generate processed sensor data 440 indicative of machine speed characteristic values (e.g., travel speed values, acceleration values, deceleration values, etc.). In some examples, other processing systems, such as processing system 238 or processing system 338 can process sensor data generated from header/speed sensor 125 or from sensor 436, or both. Additionally, while the example shown in FIG. 3 illustrates the processing system 138 (or 238 or 338) as part of in-situ sensors 108, in other examples, processing system 138 (or 238 or 338) is separate from in-situ sensors 108 but in communication with in-situ sensors 108, such as the example shown in FIG. 2.

It will be understood that geographic location 434 illustratively represents geographic locations on a field to which the values indicated by sensors 108 correspond. For example, where the in-situ sensor 108 detects a speed characteristic value, geographic location 434 indicates the location of the field where that detected speed characteristic value corresponds. As an illustrative example, the sensor data generated by sensors 108 can be timestamped and geographic position sensor data generated by geographic position sensor 104 can be timestamped. In this way, the geographic position detected at the same time as the speed characteristic can be correlated. This is merely one example.

As shown in FIG. 3, the example predictive model generator 310 includes one or more of a VI value-to-speed characteristic value model generator 442, a biomass value-to-speed characteristic value model generator 444, a topographic value-to-speed characteristic value model generator 445, a seeding characteristic value-to-speed characteristic value model generator 446, a yield value-to-speed characteristic value model generator 447, a crop state value-to-speed characteristic value model generator 448, and a soil property value-to-speed characteristic model generator 449. In other examples, the predictive model generator 310 may include additional, fewer, or different components than those shown in the example of FIG. 5. Consequently, in some examples, the predictive model generator 310 may include other items 451 as well, which may include other types of predictive model generators to generate other types of predictive speed models, such as a other map characteristic value-speed characteristic value model generator.

VI value-to-speed characteristic value model generator 442 identifies a relationship between machine speed characteristic value(s) detected in processed in-situ sensor data 440, at a geographic location to which the detected speed characteristic value(s) correspond, and vegetative index (VI) values from the VI map 432 corresponding to the same location in the worksite where the machine speed characteristic value(s) correspond. Based on this relationship established by VI value-to-speed characteristic value model generator 442, VI value-to-speed characteristic value model generator 442 generates a predictive speed model. The predictive speed model is used by speed map generator 452 to predict machine speed characteristic value(s) at different locations in the worksite based upon the georeferenced VI value contained in the VI map 432 at the same locations in the worksite. Thus, for a given location in the worksite, values of machine speed characteristics can be predicted at the given location based on the predictive speed model and the VI value, from the VI map 432, at that given location.

Biomass value-to-speed characteristic value model generator 444 identifies a relationship between machine speed characteristic value(s) detected in processed in-situ sensor data 440, at a geographic location to which the detected speed characteristic value(s) correspond, and biomass values from the biomass map 435 corresponding to the same location in the worksite where the machine speed characteristic value(s) correspond. Based on this relationship established by biomass value-to-speed characteristic value model generator 444, biomass value-to-speed characteristic value model generator 444 generates a predictive speed model. The predictive speed model is used by speed map generator 452 to predict machine speed characteristic value(s) at different locations in the worksite based upon the georeferenced biomass value contained in the biomass map 435 at the same locations in the worksite. Thus, for a given location in the worksite, values of machine speed characteristics can be predicted at the given location based on the predictive speed model and the biomass value, from the biomass map 435, at that given location.

Topographic value-to-speed characteristic value model generator 445 identifies a relationship between machine speed characteristic value(s) detected in processed in-situ sensor data 440, at a geographic location to which the detected speed characteristic value(s) correspond, and topographic values from the topographic map 439 corresponding to the same location in the worksite where the machine speed characteristic value(s) correspond. Based on this relationship established by topographic value-to-speed characteristic value model generator 445, topographic value-to-speed characteristic value model generator 445 generates a predictive speed model. The predictive speed model is used by speed map generator 452 to predict machine speed characteristic value(s) at different locations in the worksite based upon the georeferenced topographic value contained in the topographic map 439 at the same locations in the worksite. Thus, for a given location in the worksite, values of machine speed characteristics can be predicted at the given location based on the predictive speed model and the topographic value, from the topographic map 439, at that given location.

Seeding characteristic value-to-speed characteristic value model generator 446 identifies a relationship between machine speed characteristic value(s) detected in processed in-situ sensor data 440, at a geographic location to which the detected speed characteristic value(s) correspond, and seeding characteristic values from the seeding map 443 corresponding to the same location in the worksite where the machine speed characteristic value(s) correspond. Based on this relationship established by seeding characteristic value-to-speed characteristic value model generator 446, seeding characteristic value-to-speed characteristic value model generator 446 generates a predictive speed model. The predictive speed model is used by speed map generator 452 to predict machine speed characteristic value(s) at different locations in the worksite based upon the georeferenced seeding characteristic value contained in the seeding map 443 at the same locations in the worksite. Thus, for a given location in the worksite, values of machine speed characteristics can be predicted at the given location based on the predictive speed model and the seeding characteristic value, from the seeding map 443, at that given location.

Yield value-to-speed characteristic value model generator 447 identifies a relationship between machine speed characteristic value(s) detected in processed in-situ sensor data 440, at a geographic location to which the detected speed characteristic value(s) correspond, and yield values from the yield map 433 corresponding to the same location in the worksite where the machine speed characteristic value(s) correspond. Based on this relationship established by yield value-to-speed characteristic value model generator 447, yield value-to-speed characteristic value model generator 447 generates a predictive speed model. The predictive speed model is used by speed map generator 452 to predict machine speed characteristic value(s) at different locations in the worksite based upon the georeferenced yield value contained in the yield map 433 at the same locations in the worksite. Thus, for a given location in the worksite, values of machine speed characteristics can be predicted at the given location based on the predictive speed model and the yield value, from the yield map 433, at that given location.

Crop state value-to-speed characteristic value model generator 448 identifies a relationship between machine speed characteristic value(s) detected in processed in-situ sensor data 440, at a geographic location to which the detected speed characteristic value(s) correspond, and crop state values from the crop state map 437 corresponding to the same location in the worksite where the machine speed characteristic value(s) correspond. Based on this relationship established by crop state value-to-speed characteristic value model generator 448, crop state value-to-speed characteristic value model generator 448 generates a predictive speed model. The predictive speed model is used by speed map generator 452 to predict machine speed characteristic value(s) at different locations in the worksite based upon the georeferenced crop state value contained in the crop state map 437 at the same locations in the worksite. Thus, for a given location in the worksite, values of machine speed characteristics can be predicted at the given location based on the predictive speed model and the crop state value, from the crop state map 437, at that given location.

Soil property value-to-speed characteristic value model generator 449 identifies a relationship between machine speed characteristic value(s) detected in processed in-situ sensor data 440, at a geographic location to which the detected speed characteristic value(s) correspond, and soil property values from the soil property map 441 corresponding to the same location in the worksite where the machine speed characteristic value(s) correspond. Based on this relationship established by soil property value-to-speed characteristic value model generator 449, soil property value-to-speed characteristic value model generator 449 generates a predictive speed model. The predictive speed model is used by speed map generator 452 to predict machine speed characteristic value(s) at different locations in the worksite based upon the georeferenced soil property value contained in the soil property map 441 at the same locations in the worksite. Thus, for a given location in the worksite, values of machine speed characteristics can be predicted at the given location based on the predictive speed model and the soil property value, from the soil property map 441, at that given location.

In light of the above, the predictive model generator 310 is operable to produce a plurality of predictive speed models, such as one or more of the predictive speed models generated by model generators 442, 444, 445, 446, 447, 448, 449, and 451. In another example, two or more of the predictive models described above may be combined into a single predictive speed model, such as a predictive speed model that predicts machine speed characteristic values based upon two or more of the VI values, the biomass values, the topographic values, the seeding characteristic values, the yield values, the crop state values, the soil property values, and the other map characteristic values at those different locations in the field. Any of these speed models, or combinations thereof, are represented collectively by predictive speed model 450 in FIG. 3.

The predictive speed model 450 is provided to predictive map generator 312. In the example of FIG. 3, predictive map generator 312 includes a predictive speed map generator 452. In other examples, predictive map generator 312 may include additional or different map generators. Thus, in some examples, predictive map generator 312 may include other items 454 which may include other types of map generators to generate other types of maps.

Predictive speed map generator 452 receives one or more of the VI map 432, the biomass map 435, the topographic map 439, the seeding map 443, the yield map 433, the crop state map 437, the soil property map 441, and other maps 453 along with the predictive speed model 450 which predicts machine speed characteristic values based upon one or more VI values, biomass values, topographic values, seeding characteristic values, yield values, crop state values, soil property values, and other map characteristic values and generates a functional predictive speed map 460 that predicts machine speed characteristic values at different locations in the worksite.

The functional predictive speed map 460 is a predictive map 264. The functional predictive speed map 460 predicts machine speed characteristic values at different locations in a worksite. The functional predictive speed map 460 may be provided to control zone generator 313, control system 114, and/or control system 214. Control zone generator 313 generates control zones and incorporates those control zones into the functional predictive speed map 460 to produce a predictive control zone map 265, that is, a functional predictive speed control zone map 461. One or both of functional predictive speed map 460 and functional predictive speed control zone map 461 may be provided to control system 114, which generates control signals to control one or more of the controllable subsystems 116 based upon the functional predictive speed map 460, the functional predictive speed control zone map 461, or both. One or both of functional predictive speed map 460 and functional predictive speed control zone map 461 may be provided to control system 214, which generates control signals to control one or more of the controllable subsystems 216 based upon the functional predictive speed map 460, the functional predictive speed control zone map 461, or both. One or both of functional predictive speed map 460 and functional predictive speed control zone map 461 may be presented to an operator 360, such as on an operator interface mechanism 118 or 218, or to a remote user 366, such as on a remote user interface 364, or both.

Figure 4A:
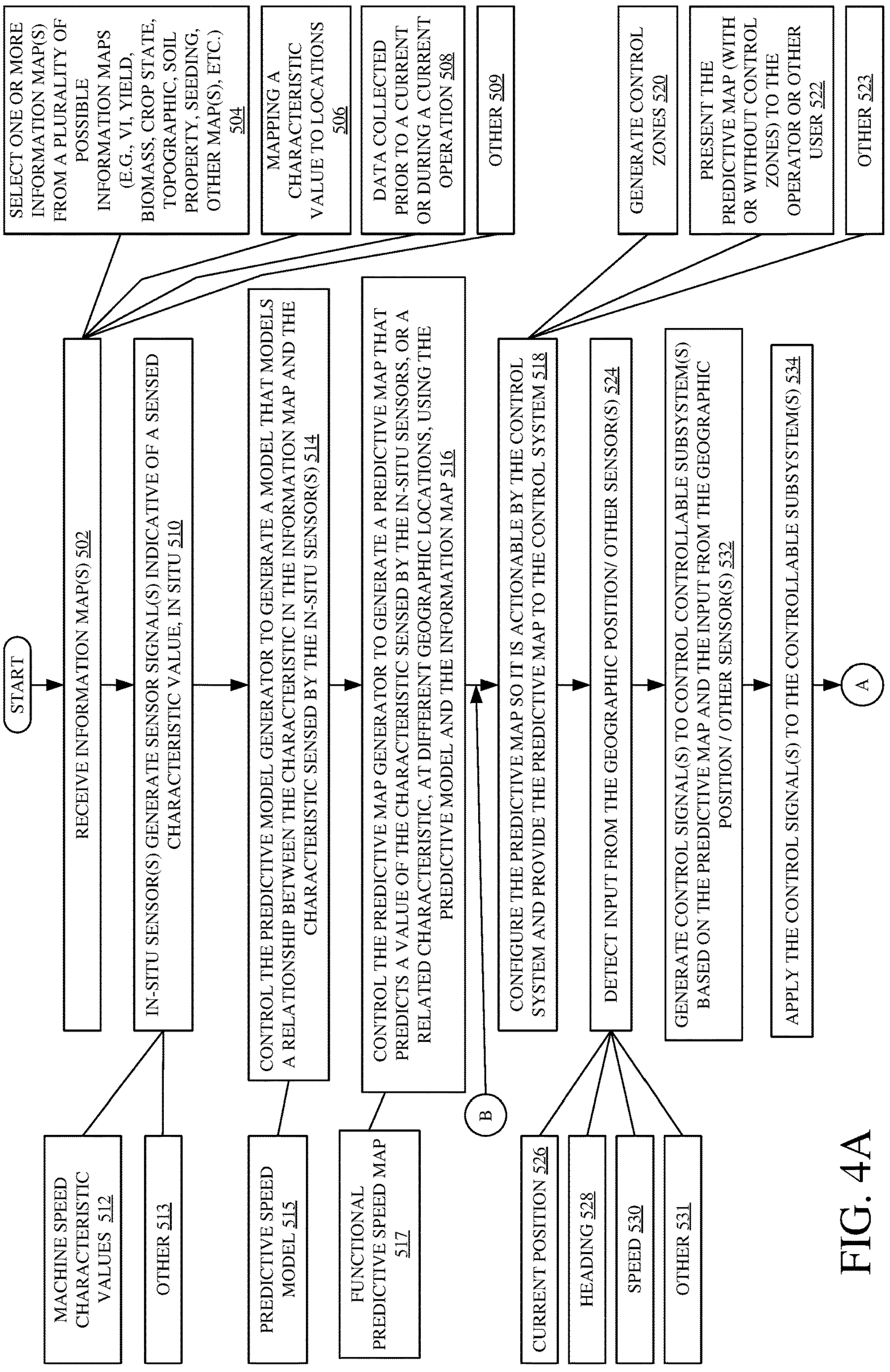
FIG. 4A-4B (collectively referred to herein as FIG. 4) is a flow diagram illustrating one example of operation of an agricultural system in generating a map.
Figure 4B:
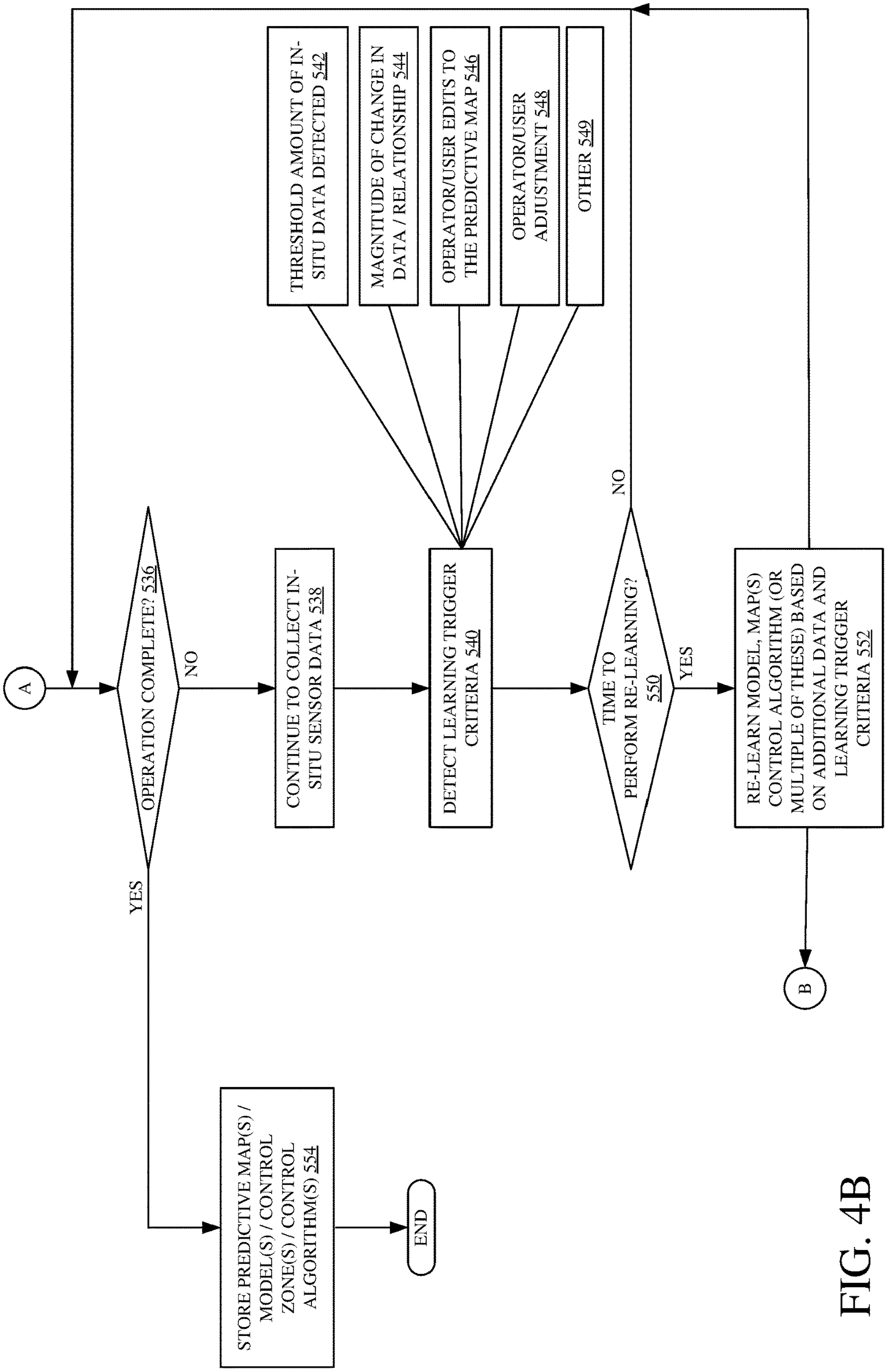

FIGS. 4A-4B (collectively referred to herein as FIG. 4) show a flow diagram illustrating one example of the operation of agricultural system architecture 400 in generating a predictive model and a predictive map.

At block 502, agricultural system 400 receives one or more information maps 358. Examples of information maps 358 or receiving information maps 358 are discussed with respect to blocks 504, 506, 508, and 509. As discussed above, information maps 358 map values of a variable, corresponding to a characteristic, to different locations in the worksite, as indicated at block 506. As indicated at block 504, receiving the information maps 358 may involve selecting one or more of a plurality of possible information maps 358 that are available. For instance, one information map 358 may be a VI map, such as VI map 432. Another information map 358 may be a yield map, such as predictive yield map 433. Another information map may be a biomass map, such as biomass map 435. Another information map may be a crop state map, such as crop state map 437. Another information map may be a topographic map, such as topographic map 439. Another information map may be a soil property map, such as soil property map 441. Another information map may be a seeding map, such as seeding map 443. Information maps may include various other types of characteristic maps, such as other maps 453. The process by which one or more information maps 358 are selected can be manual, semi-automated, or automated. The information maps 358 can be based on data collected prior to a current operation. For instance, the data may be collected based on aerial images taken during a previous year, or earlier in the current season, or at other times. The data may be based on data detected in ways other than using aerial images. For instance, the data may be collected during a previous operation on the worksite, such an operation during a previous year, or a previous operation earlier in the current season, or at other times. The machines performing those previous operations may be outfitted with one or more sensors that generate sensor data indicative of one or more characteristics. For example, the sensed position and orientation of a mobile machine operating at the worksite in a previous operation may be used as data to generate a topographic map. In another example, the operational parameters and other data from a seeding operation performed by a seeding machine at the worksite in the same year may be used as data to generate a seeding map. In other examples, and as described above, the information maps 358 may be predictive maps having predictive values, such as a predictive yield map having predictive yield values. The predictive information map 358 can be generated by predictive map generator 312 based on a model generated by predictive model generator 310. The data for the information maps 358 can be obtained by predictive model generator 310 and predictive map generator 312 using communication system 306 and stored in data store 304. The data for the information maps 358 can be obtained by agricultural system 400 using a communication system in other ways as well, and this is indicated by block 509 in the flow diagram of FIG. 4.

As agricultural harvester 100 is operating, in-situ sensors 108 generate sensor signals indicative of one or more in-situ data values indicative of a characteristic, as indicated by block 510. For example, heading/speed sensors 125 or feedrate controller output sensor 436, or both, generate sensor signals indicative of one or more in-situ machine speed characteristic values (e.g., travel speed values, acceleration values, deceleration values, etc.), as indicated by block 512. In some examples, data from in-situ sensors 108 is georeferenced using position data from geographic position sensor 126.

Predictive model generator 310 controls one or more of the VI value-to-speed characteristic value model generator 442, the biomass value-to-speed characteristic value generator 444, the topographic value-to-speed characteristic value generator 445, the seeding characteristic value-to-speed characteristic value model generator 446, the yield value-to-speed characteristic value model generator 447, the crop state value-to-speed characteristic value model generator 448, the soil property value-to-speed characteristic value model generator 449, and other map characteristic value-to-speed characteristic value model generator 451 to generate a model that models the relationship between the mapped values, such as the VI values, the biomass values, the topographic values, the seeding characteristic values, the yield values, the crop state values, the soil property values, and the other map characteristic values contained in the respective information map and the in-situ values sensed by the in-situ sensors 108 as indicated by block 514. Predictive model generator 310 generates a predictive speed model 450 as indicated by block 515.

The relationship or model generated by predictive model generator 310 is provided to predictive map generator 312. Predictive map generator 312 controls predictive speed map generator 452 to generate a functional predictive speed map 460 that predicts values of machine speed characteristic (or sensor value(s) indictive of values of machine speed characteristics) at different geographic locations in a worksite at which agricultural harvester 100 is operating using the predictive speed model 450 and one or more of the information maps, VI map 432, predictive yield map 433, biomass map 435, crop state map 437, topographic map 439, soil property map 441, seeding map 443, and various other maps 453 as indicated by block 516.

It should be noted that, in some examples, the functional predictive speed map 460 may include two or more different map layers. Each map layer may represent a different data type, for instance, a functional predictive speed map 460 that provides two or more of a map layer that provides predictive values of machine speed characteristics based on VI values from VI map 432, a map layer that provides predictive values of machine speed characteristics based on yield values from predictive yield map 433, a map layer that provides predictive values of machine speed characteristics based on biomass values from biomass map 435, a map layer that provides predictive values of machine speed characteristics based on crop state values from crop state map 437, a map layer that provides predictive values of machine speed characteristics based on topographic values from topographic map 439, a map layer that provides predictive values of machine speed characteristics based on soil property values from soil property map 441, a map layer that provides predictive values of machine speed characteristics based on seeding characteristic values from seeding map 443, and a map layer that provides predictive values of machine speed characteristics based on other map values from other map 453. In some examples, the functional predictive speed map 460 may include a map layer that provides predictive values of machine speed characteristics based on two or more of VI values from VI map 432, yield values from predictive yield map 433, biomass values from biomass map 435, crop state values from crop state map 437, topographic values from topographic map 439, soil property values from soil property map 441, seeding characteristic values from seeding map 443, and other map values from other map 453.

At block 518, predictive map generator 312 configures the functional predictive speed map 460 so that the functional predictive speed map 460 is actionable (or consumable) by control system 114 or 214, or both. Predictive map generator 312 can provide the functional predictive speed map 460 to the control system 114, to the control system 214, and/or to control zone generator 313. Some examples of the different ways in which the functional predictive speed map 460 can be configured or output are described with respect to blocks 518, 520, 522, and 523. For instance, predictive map generator 312 configures functional predictive speed map 460 so that functional predictive speed map 460 includes values that can be read by control system 114 or 214, or both, and used as the basis for generating control signals for one or more of the different controllable subsystems 116 of agricultural harvester 100 or controllable subsystems 216 of a respective receiving machine 200, as indicated by block 518.

At block 520, control zone generator 313 can divide the functional predictive speed map 460 into control zones based on the values on the functional predictive speed map 460 to generate functional predictive speed control zone map 461. Contiguously-geolocated values that are within a threshold value of one another can be grouped into a control zone. The threshold value can be a default threshold value, or the threshold value can be set based on an operator input, based on an input from an automated system, or based on other criteria. A size of the zones may be based on a responsiveness of the control system, the controllable subsystems, based on wear considerations, or on other criteria.

At block 522, predictive map generator 312 configures functional predictive speed map 460 for presentation to an operator or other user. At block 522, control zone generator 313 can configure functional predictive speed control zone map 461 for presentation to an operator or other user. When presented to an operator or other user, the presentation of the functional predictive speed map 460 or of functional predictive speed control zone map 461 or both may contain one or more of the predictive values on the functional predictive speed map 460 correlated to geographic location, the control zones of functional predictive speed control zone map 461 correlated to geographic location, and settings values or control parameters that are used based on the predicted values on predictive map 460 or control zones on predictive control zone map 461. The presentation can, in another example, include more abstracted information or more detailed information. The presentation can also include a confidence level that indicates an accuracy with which the predictive values on predictive map 460 or the control zones on predictive control zone map 461 conform to measured values that may be measured by sensors on agricultural harvester 100 as agricultural harvester 100 operates at the worksite. Further where information is presented to more than one location, an authentication and authorization system can be provided to implement authentication and authorization processes. For instance, there may be a hierarchy of individuals that are authorized to view and change maps and other presented information. By way of example, an on-board display device may show the maps in near real time locally on the machine, or the maps may also be generated at one or more remote locations, or both. In some examples, each physical display device at each location may be associated with a person or a user permission level. The user permission level may be used to determine which display elements are visible on the physical display device and which values the corresponding person may change. As an example, a local operator of agricultural harvester 100 or a receiving machine 200 may be unable to see the information corresponding to the predictive map 460 or make any changes to machine operation. A supervisor, such as a supervisor at a remote location, however, may be able to see the predictive map 460 on the display but be prevented from making any changes. A manager, who may be at a separate remote location, may be able to see all of the elements on predictive map 460 and also be able to change the predictive map 460. In some instances, the predictive map 460 accessible and changeable by a manager located remotely may be used in machine control. This is one example of an authorization hierarchy that may be implemented. The predictive map 460 or predictive control zone map 461 or both can be configured in other ways as well, as indicated by block 523.

At block 524, when agricultural harvester 100 is being controlled, input from geographic position sensor 126 and other in-situ sensors 108 are received by the control system 114. Particularly, at block 526, control system 114 detects an input from the geographic position sensor 126 identifying a geographic location of agricultural harvester 100. Block 528 represents receipt by the control system 114 of sensor inputs indicative of trajectory or heading of agricultural harvester 100, and block 530 represents receipt by the control system 114 of a speed of agricultural harvester 100. Block 531 represents receipt by the control system 114 of other information from various in-situ sensors 308.

At block 524, when a receiving machine 200 is being controlled, input from geographic position sensor 226 and other in-situ sensors 208 are received by the control system 214. Particularly, at block 526, control system 214 detects an input from the geographic position sensor 226 identifying a geographic location of receiving machine 200. Block 528 represents receipt by the control system 214 of sensor inputs indicative of trajectory or heading of receiving machine 200, and block 530 represents receipt by the control system 214 of a speed of receiving machine 200. Block 531 represents receipt by the control system 214 of other information from various in-situ sensors 308.

At block 532, where agricultural harvester 100 is being controlled, control system 114 generates control signals to control the controllable subsystems 116 based on the functional predictive speed map 460 or the functional predictive speed control zone map 461 or both and the input from the geographic position sensor 126 and any other in-situ sensors 108. At block 534, control system 114 applies the control signals to the controllable subsystems 116. It will be appreciated that the particular control signals that are generated, and the particular controllable subsystems 116 that are controlled, may vary based upon one or more different things. For example, the control signals that are generated and the controllable subsystems 116 that are controlled may be based on the type of functional predictive speed map 460 or functional predictive speed control zone map 461 or both that is being used. Similarly, the control signals that are generated and the controllable subsystems 116 that are controlled and the timing of the control signals can be based on various latencies of agricultural harvester 100 and the responsiveness of the controllable subsystems 116.

At block 532, where a receiving machine 200 is being controlled, control system 214 generates control signals to control the controllable subsystems 216 based on the functional predictive speed map 460 or the functional predictive speed control zone map 461 or both and the input from the geographic position sensor 226 and any other in-situ sensors 208. At block 534, control system 214 applies the control signals to the controllable subsystems 216. It will be appreciated that the particular control signals that are generated, and the particular controllable subsystems 216 that are controlled, may vary based upon one or more different things. For example, the control signals that are generated and the controllable subsystems 216 that are controlled may be based on the type of functional predictive speed map 460 or functional predictive speed control zone map 461 or both that is being used. Similarly, the control signals that are generated and the controllable subsystems 216 that are controlled and the timing of the control signals can be based on various latencies of the receiving machine 200 and the responsiveness of the controllable sub systems 216.

At block 536, a determination is made as to whether the operation has been completed. If the operation is not completed, the processing advances to block 538 where in-situ sensor data from geographic position sensor 126 and in-situ sensors 108 (and perhaps other sensors) and from geographic position sensor 226 and in-situ sensors 208 (and perhaps other sensors) continue to be read.

In some examples, at block 540, agricultural system 400 can also detect learning trigger criteria to perform machine learning on one or more of the functional predictive speed map 460, functional predictive speed control zone map 461, predictive speed model 450, the zones generated by control zone generator 313, one or more control algorithms implemented by the controllers in the control system 114 or the control system 214, and other triggered learning.

The learning trigger criteria can include any of a wide variety of different criteria. Some examples of detecting trigger criteria are discussed with respect to blocks 542, 544, 546, 548, and 549. For instance, in some examples, triggered learning can involve recreation of a relationship used to generate a predictive model when a threshold amount of in-situ sensor data are obtained from in-situ sensors 108. In such examples, receipt of an amount of in-situ sensor data from the in-situ sensors 108 that exceeds a threshold triggers or causes the predictive model generator 310 to generate a new predictive model that is used by predictive map generator 312. Thus, as agricultural harvester 100 continues an operation, receipt of the threshold amount of in-situ sensor data from the in-situ sensors 108 triggers the creation of a new relationship represented by a new predictive speed model 450 generated by predictive model generator 310. Further, a new functional predictive speed map 460, a new functional predictive speed control zone map 461, or both can be generated using the new predictive speed model 450. Block 542 represents detecting a threshold amount of in-situ sensor data used to trigger creation of a new predictive model.

In other examples, the learning trigger criteria may be based on how much the in-situ sensor data from the in-situ sensors 108 are changing, such as over time or compared to previous values. For example, if variations within the in-situ sensor data (or the relationship between the in-situ sensor data and the information in the one or more information maps 358) are within a selected range or is less than a defined amount, or below a threshold value, then a new predictive model is not generated by the predictive model generator 310. As a result, the predictive map generator 312 does not generate a new functional predictive speed map 460, a new functional predictive speed control zone map 461, or both. However, if variations within the in-situ sensor data are outside of the selected range, are greater than the defined amount, or are above the threshold value, for example, then the predictive model generator 310 generates a new predictive model 450 using all or a portion of the newly received in-situ sensor data that the predictive map generator 312 uses to generate a new predictive map 460 which can be provided to control zone generator 313 for the creation of a new predictive control zone map 461. At block 544, variations in the in-situ sensor data, such as a magnitude of an amount by which the data exceeds the selected range or a magnitude of the variation of the relationship between the in-situ sensor data and the information in the one or more information maps, can be used as a trigger to cause generation of one or more of a new predictive model 450, a new predictive map 460, and a new predictive control zone map 461. Keeping with the examples described above, the threshold, the range, and the defined amount can be set to default values; set by an operator or user interaction through a user interface; set by an automated system; or set in other ways.

Other learning trigger criteria can also be used. For instance, if predictive model generator 310 switches to a different information map (different from the originally selected information map), then switching to the different information map may trigger re-learning by predictive model generator 310, predictive map generator 312, control zone generator 313, control system 314, or other items. In another example, transitioning of agricultural harvester 100 to a different topography, a different control zone, a different region of the worksite, a different area with different grouped characteristics (such as a different crop genotype area) may be used as learning trigger criteria as well.

In some instances, an operator 360 or user 366 can also edit the functional predictive speed map 460 or functional predictive speed control zone map 461 or both. The edits can change a value on the functional predictive speed map 460, change a size, shape, position, or existence of a control zone on functional predictive speed control zone map 461, or both. Block 546 shows that edited information can be used as learning trigger criteria.

In some instances, it may also be that an operator 360 or user 366 observes that automated control of a controllable subsystem, is not what the operator or user desires. In such instances, the operator 360 or user 366 may provide a manual adjustment to the controllable subsystem reflecting that the operator 360 or user 366 desires the controllable subsystem to operate in a different way than is being commanded by control system. Thus, manual alteration of a setting by the operator or user can cause one or more of predictive model generator 310 to relearn a model, predictive map generator 312 to regenerate functional predictive speed map 460, control zone generator 313 to regenerate one or more control zones on functional predictive speed control zone map 461, and a control system to relearn a control algorithm or to perform machine learning on one or more of the controllers in the control system based upon the adjustment by the operator or user, as shown in block 548. Block 549 represents the use of other triggered learning criteria.

In other examples, relearning may be performed periodically or intermittently based, for example, upon a selected time interval such as a discrete time interval or a variable time interval, as indicated by block 550.

If relearning is triggered, whether based upon learning trigger criteria or based upon passage of a time interval, as indicated by block 550, then one or more of the predictive model generator 310, predictive map generator 312, control zone generator 313, and control system 314 performs machine learning to generate a new predictive model, a new predictive map, a new control zone, and a new control algorithm, respectively, based upon the learning trigger criteria. The new predictive model, the new predictive map, the new control zone, and the new control algorithm are generated using any additional data that has been collected since the last learning operation was performed. Performing relearning is indicated by block 552.

If the operation has been completed, operation moves from block 552 to block 554 where one or more of the functional predictive speed map 460, functional predictive speed control zone map 461, the predictive speed model 450 generated by predictive model generator 310, the control zone(s), and the control algorithm(s) are stored. The predictive map 460, predictive control zone map 461, and predictive model 450 may be stored locally on a data store of the machine (e.g., data store 104 of agricultural harvester 100 or data store 204 of a receiving machine 200) or stored at data store 304 or remote computing systems 300 for later use.

If the operation has not been completed, operation returns to block 518 such that the new predictive map, the new control zone(s), and/or the new control algorithm(s) can be used to control the agricultural harvester 100 or the receiving machine(s) 200, or both.

Some examples of the control based on functional predictive speed map 460 or functional predictive speed control zone map 461, or both, will now be described.

As an illustrative example, the functional predictive speed map 460 or functional predictive speed control zone map 461 can be used to control the agricultural harvester 100 or the receiving machine 200, or both, such as during a material transfer operation. For instance, control system 214 of receiving machine 200 can control propulsion subsystem 250 such that receiving machine 200 is predictively controlled to match the travel speed of agricultural harvester 100. In some examples of a material transfer operation, the chute 107 and spout 109 of agricultural harvester 100 may be rotated to a set position, such as the position shown in FIG. 1, and receiving machine 200 may be controlled to travel alongside agricultural harvester 100 in a relative fore-to-aft position relative to the fore-to-aft position of the agricultural harvester 100 and the speed characteristics of the receiving machine 200 can be controlled based on the values in the functional predictive speed map 460 or functional predictive speed control zone map 461. For example, during a material transfer operation with a fore-to-aft filling strategy, the receiving machine 200 will travel alongside the agricultural harvester at a lateral distance from agricultural harvester 100 such that material from spout 109 lands in the grain bin of the receiving machine 200 (preferably at a lateral distance such that material from spout 109 lands at an approximate halfway point of the width of the interior of the grain bin). The receiving machine 200 will be controlled to accelerate until the front portion of the grain bin is aligned relative to the spout such that material will land in the forward portion (front volume) of the grain bin. When the front volume of the grain bin becomes full or attains a target fill level (which can be indicated by fill level sensors 124 or 224) the receiving machine 200 will be controlled to temporarily accelerate to adjust its relative fore-to-aft position such that material will be deposited in the next volume according to the fill strategy (e.g., the middle volume or rear volume, depending on the relative to size of the grain bin and distribution of material). In an aft-to-fore filling strategy, the receiving machine 200 can be controlled to first align a rear portion of the grain bin such that it receives material and, once filled, will be controlled to temporarily decelerate to adjust its relative fore-to-aft position to begin filling the next portion. During either of these material transfer operations (e.g., fore-to-aft or aft-to-fore), the acceleration, deceleration, and travel speed of the receiving machine 200 are based on the speed characteristic values in the functional predictive speed map 460 or functional predictive speed control zone map 461.

In another example, the rotation of the of the chute 107 and spout 109 can be used to adjust the fill position (e.g., the position in the grain bin of the receiving vehicle into which material is being deposited). For instance, the receiving machine 200 can be controlled to travel alongside the agricultural harvester 100 at a given lateral distance away from the agricultural harvester. Once alongside the agricultural harvester 100, the travel speed of the receiving machine 200 will be controlled such that it predictively matches the travel speed of the agricultural harvester based on the speed characteristic values in functional predictive speed map 460 or functional predictive speed control zone map 461. In some examples, the relative fore-to-aft position of the receiving machine 200 may be initially set based on a desired fill strategy. Once a first volume is filled, the chute 107 and spout 109 may be rotated to align with the next volume to be filled while the receiving machine maintains its relative fore-to-aft position. In some examples, the length and rotational angles of the chute 107 and spout 109 are such that, in order to fill the entire grain bin of the receiving machine 200, the position of the receiving machine 200 may need to be adjusted, such as the lateral offset of the receiving machine 200 from the agricultural harvester 100 or the relative fore-to-aft position, or both. In either case, the receiving machine 200 can be controlled to adjust its position, either controlling steering subsystem 252 to adjust the heading (and thus the lateral distance between the receiving machine 200 and the agricultural harvester 100) of the receiving machine 200 or the controlling propulsion subsystem 252 to temporarily accelerate or to temporarily decelerate to adjust its relative fore-to-aft position, or both.

As can be seen, the functional predictive speed map 460 or functional predictive speed control zone map 461, or both, can be used to predictively control a receiving machine 200, such as during a material transfer operation, to predictively match the travel speed of agricultural harvester 100 and to predictively accelerate or predictively decelerate to adjust the position of the receiving machine 200 relative to the agricultural harvester 100. Further, it can be seen that functional predictive speed map 460 or functional predictive speed control zone map 461, or both, can be used to control the agricultural harvester 100, the receiving machine 200, or both.

Figure 5:
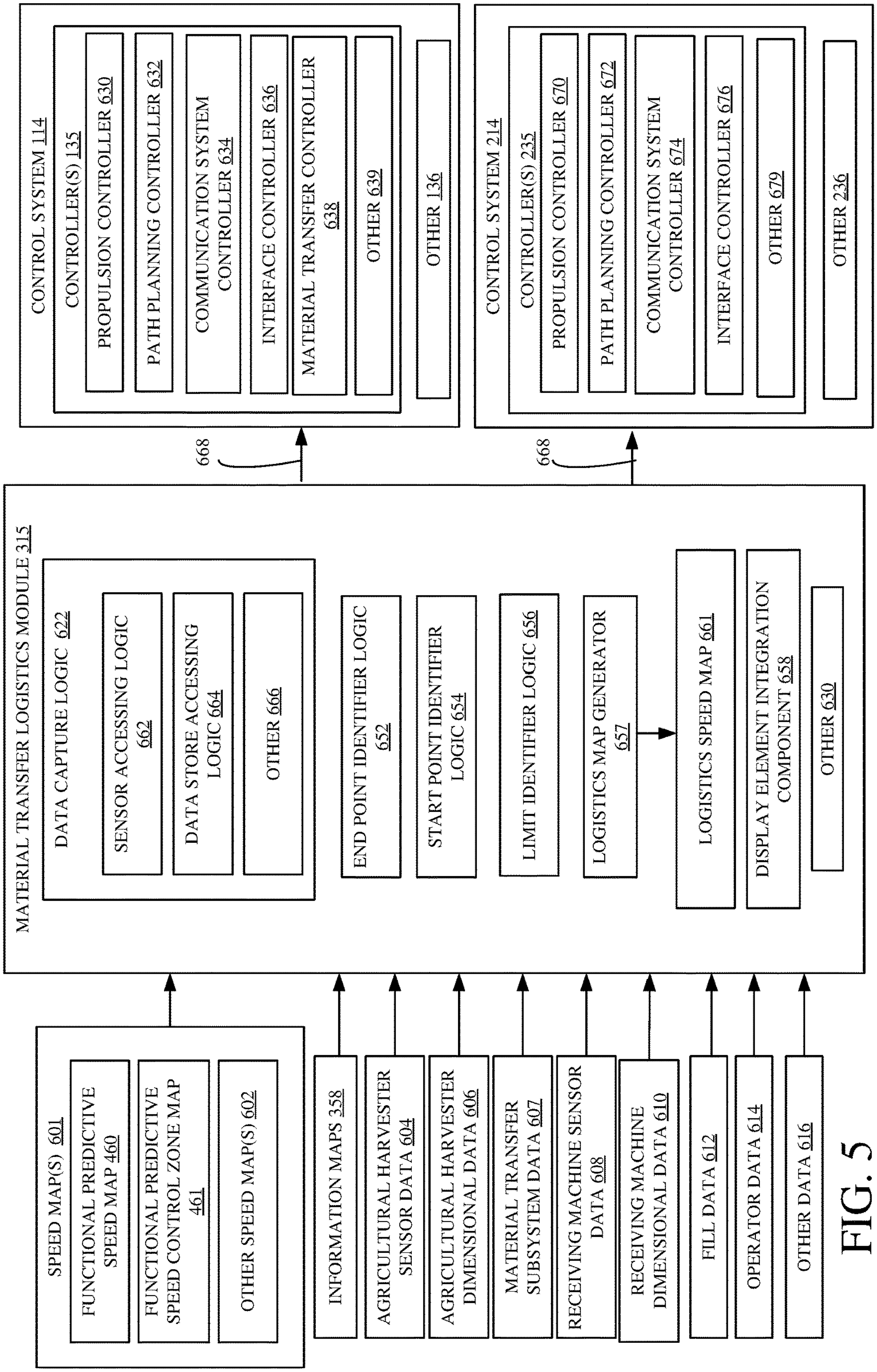
FIG. 5 is a block diagram showing some portions of an agricultural system in more detail, according to some examples of the present disclosure.

FIG. 5 is a block diagram of a portion of the agricultural system architecture 400 shown in FIG. 2. Particularly, FIG. 5 shows examples of the material transfer logistics module 315 in more detail. FIG. 5 also illustrates information flow among the various components shown.

As illustrated in FIG. 5, material transfer logistics module 315 receives one or more speed maps 601, one or more information maps 358, agricultural harvester sensor data 604, agricultural harvester dimensional data 606, material transfer subsystem data 607, receiving machine sensor data 608, receiving machine dimensional data 610, fill data 612, operator data 614, and can receive various other data 616. Speed maps 601 can include functional predictive speed map 460, functional predictive speed control zone map 461, as well as various other speed maps 602, such as a prescriptive speed map that contains prescriptive (or commanded) speed values for the agricultural harvester at different locations at the worksite. Agricultural harvester sensor data 604 includes data generated by or derived from in-situ sensors 108 of agricultural harvester 100. Agricultural harvester dimensional data 606 includes dimensional information of the agricultural harvester 100 such as the length and width of the agricultural harvester, as well as dimensional information with regard to the grain tank 111 of agricultural harvester 100, and dimensional information with regard to the material transfer subsystem 154 of agricultural harvester 100. Material transfer subsystem data 607 includes operational information with regard to the material transfer subsystem, such as an indication that the material transfer subsystem 154 is operating, such as a rate at which material transfer subsystem 154 can convey material (e.g., 5 bushel per second) or a rate at which material transfer subsystem 154 is conveying material. In some examples, the material transfer subsystem data 607 can be stored in memory, or can be derived from sensor data, such as a sensor that senses the speed of rotation of the auger or blower of material transfer subsystem 154. Receiving machine sensor data 608 includes data generated by or derived from in-situ sensors 208 of receiving machine 200. Receiving machine dimensional data 610 includes dimensional information of the receiving machine 200 such as the length and width of the receiving machine 200, as well as dimensional information with regard to the grain bin (e.g., 172 or 192) of receiving machine 200. Fill data 612 includes fill levels of the grain tank 111 of agricultural harvester 100, fill levels of the grain bins (e.g., 172 or 192) of receiving machine 200, fill strategy (e.g., front-to-back fill strategy, back-to-front fill strategy, etc.), as well as current fill location, that is, the location where the crop material is being deposited (e.g., front, middle, or back of the grain bin of the receiving machine 200). Operator data 614 includes data indicative of operator status characteristics such as an experience level of operators 360, a skill level of operators 360, as well as data indicative of a fatigue of operators 360. Material transfer logistics module 315 can receive any of a wide variety of other data 616 as well.

As illustrated in FIG. 5, material transfer logistics module 315 includes data capture logic 622, end point identifier logic 652, start point identifier logic 654, limit identifier logic 656, logistics map generator 657, map overlay integration component 658, and can include other items 630 as well. It will be noted that material transfer logistics module 315 can include (as other items 630) one or more processors or servers or can utilize one or more processors or servers of system 400, such as processors or servers 301. Material transfer logistics module 315 may also by implemented by hardware items, such as processors, memory, or other processing components, some of which are described in further detail below. In other examples material transfer logistics module 315 may be implemented by software that is loaded into a memory and is subsequently executed by one or more processors or servers. In other examples, harvesting logistics module 315 may be implemented by different combinations of hardware, software, firmware, etc., some examples of which are described below. Data capture logic 622, itself, includes sensor accessing logic 662, data store accessing logic 624, and can include other items 630 as well. Data capture logic 622 captures or obtains data that can be used by other items of material transfer logistics module 315. Sensor accessing logic can be used by material transfer logistics module 315 to obtain or otherwise access sensor data (or values indicative of the sensed variables/characteristics) provided from in-situ sensors 108 and 208. Additionally, data store accessing logic 624 can be used by material transfer logistics module 315 to obtain or access data stored on data stores 104, 204, and/or 304. Upon obtaining the various data, material transfer logistics module 315 generates logistics outputs 668 which can be used in the control of agricultural harvester 100 and/or a receiving machine 200.

The logistic outputs 668 can be provided to control system 114 to control agricultural harvester 100. As illustrated in FIG. 5, controllers 135 of control system 114 include propulsion controller 630, path planning controller 632, communication system controller 634, interface controller 636, material transfer controller 638, and can include various other controllers 639. Propulsion controller 630 generates control signals to control propulsion subsystem 150, such as to control the acceleration, acceleration limits, deceleration, deceleration limits, or travel speed of agricultural harvester 100. Path planning controller 632 generates control signals to control steering subsystem 152, such as to control the heading of agricultural harvester 100. Communication system controller 634 controls communication system 106 to send or obtain information, or both. Interface controller 636 generates control signals to control operator interface mechanism(s) 118 such as to provide displays, alerts, notifications, recommendations, or various other indications. Material transfer controller 638 generates control signals to control material transfer subsystem 154 such as to initiate or end a material transfer operation, to control the flow rate of material through the chute 107 and spout 109 such as by controlling the operational speed of the auger or blower, as well as to control the position (e.g., rotational position) of chute 107 and spout 109.

It will be noted that the interface controller 636 is also operable to present the maps obtained by agricultural system 400, such as one or more of the information maps 358, the functional predictive speed map 460, the functional predictive speed control zone map 461, other speed maps 602, logistics map 661, and other maps or other information derived from or based on the maps to an operator 360 or a remote user 366. As an example, interface controller 636 generates control signals to control a display mechanism (e.g., 118 or 364) to display one or more of the maps or information derived from the maps. Interface controller 636 may generate operator or user actuatable mechanisms that are displayed and can be actuated by the operator or user to interact with the displayed map. The operator or user can edit the map by, for example, correcting a value displayed on the map, based on the operator's or the user's observation.

The logistic outputs 668 can be provided to control system 214 to control a receiving machine 200. As illustrated in FIG. 5, controllers 235 of control system 214 include propulsion controller 670, path planning controller 672, communication system controller 674, interface controller 676, and can include various other controllers 639. Propulsion controller 670 generates control signals to control propulsion subsystem 250, such as to control the acceleration, acceleration limits, deceleration, deceleration limits, or travel speed of receiving machine 200. Path planning controller 672 generates control signals to control steering subsystem 252, such as to control the heading of receiving machine 200. Communication system controller 674 controls communication system 206 to send or obtain information, or both. Interface controller 676 generates control signals to control operator interface mechanism(s) 218 such as to provide displays, alerts, notifications, recommendations, or various other indications.

It will be noted that the interface controller 676 is also operable to present the maps obtained by agricultural system 400, such as one or more of the information maps 358, the functional predictive speed map 460, the functional predictive speed control zone map 461, other speed maps 602, logistics map 661, and other maps or other information derived from or based on the maps to an operator 360 or a remote user 366. As an example, interface controller 676 generates control signals to control a display mechanism (e.g., 218 or 364) to display one or more of the maps or information derived from the maps. Interface controller 676 may generate operator or user actuatable mechanisms that are displayed and can be actuated by the operator or user to interact with the displayed map. The operator or user can edit the map by, for example, correcting a value displayed on the map, based on the operator's or the user's observation.

Limit identifier logic 656 illustratively identifies operational limits for the control of agricultural harvester 100 or receiving machine 200. The limits identified by limit identifier logic 656 can be provided by an operator 360 or a user 366, can be stored in a data store, or can be determined by limit identifier logic 656 based on one or more of the data items obtained by material transfer logistics module 315. For example, limit identifier logic 656 can identify trafficability limits which indicate worksite conditions in which the receiving machine 200 is not allowed to travel, such as wet areas of the field or areas of the worksite with certain soil types, or is only allowed to travel if satisfying given weight limits. For instance, such areas may be more susceptible to compaction or may affect the speed of the receiving machine 200 (e.g., due to wheel slippage or bogging down, etc.). In another example, limit identifier logic 656 may identify a limit such as preventing material transfer when the agricultural harvester is traveling uphill as the required speed while traveling uphill may require the maximum output of the power plant of the machine and thus initiating a material transfer operation during such a time will reduce the speed of the agricultural machine 100 due to the power draw of the material transfer operation. In other examples, limit identifier logic 656 may identify material transfer operation limits, such as preventing performance of a material transfer operation during a turn (e.g., such as a turn that occurs when the machines transition from one crop row to another, or various other turns). In some examples, limit identifier logic 656 may identify speed characteristic limits, such as deceleration and acceleration limits for the agricultural harvester 100 or the receiving machine 200, or both. For instance, due to topographic characteristics of the field or orientation of the receiving machine 200, the travel speed, the acceleration, or the deceleration of the receiving machine 200 or of the harvester 100, or both, may be limited to reduce the likelihood of material shift within a material receptacle of the machine 200 (e.g., 172, 192, etc.) or within a material receptacle of harvester 100 (e.g., 111, etc.), or both. Material shift can increase machine stress or wear, lead to material spill, or have other deleterious effects. In other examples, due to the fill level of the receiving machine 200, as indicated by fill level data 612, such as fill level data provided by fill level sensors, the travel speed, the acceleration, or the deceleration of the receiving machine 200 may be limited to reduce the likelihood of material shift. In other examples, due to the fill level of the harvester 100, as indicated by fill level data 612, such as fill level data provided by fill level sensors, the travel speed, the acceleration, or the deceleration of the harvester 100 may be limited to reduce the likelihood of material shift. In other examples, the acceleration or deceleration of the machine 200 or the harvester 100, or both, may be limited depending on the fill position, as indicated by fill data 612. For instance, when filling near the front or back of the material receptacle (e.g., grain bin, etc.), the acceleration or deceleration of the machine 200 or the harvester 100, or both, may need to be limited to prevent material spill due to misalignment of the material receptacle relative to the spout 109 caused by the acceleration or deceleration. In some examples, where the acceleration or deceleration of the machine 200 is limited it may be that the chute 107 and spout 109 may be rotated to change fill position rather than accelerating or decelerating the machine 200. In other examples, when the acceleration or deceleration of the harvester 100 is limited it may be that receiving machine 200 is accelerated or decelerated. In other examples, two or more of the harvester 100, the chute 107 and spout 109, and the receiving machine 200 may be controllably adjusted. In another example, limit identifier logic 656 may identify fill level limits that indicate a target fill level of either the agricultural harvester 100 or the receiving machine 200. The fill level limit may be used to determine when to initiate a material transfer operation and when to end a material transfer operation, as well as to control the position of the agricultural harvester 100 or the chute 107 and spout 109 of the harvester 100 or the receiving machine 200 (e.g., relative fore-to-aft position or lateral offset). Limit identifier logic 656 may identify limits based further on start points and end points or based further on detection of a material transfer operation being performed or initiated.

These and various other limits can be identified by limit identifier logic 656 and used in the control of the agricultural harvester 100 or the receiving machine 200, or both.

In some examples, the various limits identified by limit identifier logic 656 can be based on operator status characteristics (e.g., skill, experience, fatigue, etc.) of the operator of the receiving machine 200 or of the operator of the agricultural harvester 100, as indicated by operator data 614. As an example, limit identifier logic 656 may identify a limit, such as no material transfer during a turn, where the operator is relatively less experienced, relatively less skilled, or is fatigued. This could be because a less experienced operator, a less skilled operator, or a tired operator may struggle to maintain necessary positioning between the machines. In some examples, the limits may be dynamic, for instance, there may be no limit for an experienced operator or a skilled operator during an initial part of an operation, however, as the operator becomes more fatigued (e.g., after the operation has been underway for a given amount of time) a limit may be imposed. In another example, a first limit for an inexperienced or lesser skilled operator may be imposed during an initial part of an operation and may be adjusted to a second limit as the operator becomes more fatigued (e.g., after the operation has been underway for a given amount of time). In some examples, one or more of the travel speed, acceleration, and deceleration of the harvester 100 or the receiving machine 200, or both, may be limited based on operator status characteristics.

End point identifier logic 652 illustratively identifies areas of the worksite where a material transfer operation is not to take place and thus identifies locations at the worksite where a material transfer operation is to end. In some examples, end point identifier logic 652 identifies the areas of the worksite based on limits output by limit identifier logic 656, based on characteristics of the worksite indicated by the maps obtained by material transfer logistics module 315, and based on other data items obtained by material transfer logistics module 315. For instance, where limit identifier logic 656 provides a limit indicating that a material transfer operation cannot take place during a turn, end point identifier logic 652 identifies, as end points, areas of the worksite at the end of crop rows or other areas of the field where a turn may occur, such as areas of the field that are not straight or follow a curve. The locations of crop rows could be indicated by one or more of the maps obtained by module 315, such as VI map 432, yield map 433, biomass map 435, crop state map 437, seeding map 443, as well as various other maps, such as a harvest coverage map that indicates crop and crop row locations, as well as areas of the field that have been harvested and areas of the field that have not been harvested. In another example, where limit identifier logic 656 provides a limit indicating that no material transfer can occur at areas of the worksite where the agricultural harvester 100 is traveling uphill, end point identifier logic 652 identifies areas of the worksite where the agricultural harvester will be traveling uphill 652 and identifies, as end points, areas immediately preceding the beginning of uphill travel. The topographic characteristics of the worksite can be indicated by one or more of the maps obtained by module 315, such as topographic map 439. Additionally, in identifying, as end points, areas of the field where agricultural harvester 100 will be traveling uphill, end point identifier logic 652 can also consider the current heading and geographic position data of agricultural harvester 100 as provided by agricultural harvester sensor data 604. In another example, where limit identifier logic 656 provides a limit indicating that no material transfer can occur at areas of the field with given characteristics or that receiving machine 200 is not to travel on areas of the worksite with given characteristics, end point identifier logic 652 identifies, as end points, areas of the worksite prior to those areas, relative to the heading of the agricultural harvester 100 (as indicated by agricultural harvester sensor data 604) or the receiving machine 200 (as indicated by receiving machine sensor data 608). In another example, end point identifier logic 652 can also consider the yield or mass flowing into the on-board grain tank of the harvester 100, as well as the remaining capacity of the receiving machine 200 in identifying an end point. For example, it may be that end point identifier logic 652 identifies as an end point a location at which the receiving machine will be full, at least to a threshold amount. In another example, end point identifier logic 652 may identify as an end point a location at which the remaining capacity in the harvester 100 and the yield along the travel path of the harvester 100 will be such harvester 100 can travel to another location (e.g., can finish a pass or a next pass) prior to needing to perform additional material transfer. End point identifier logic 652 can identify the areas of the worksite with the given characteristics based on one or more of the maps obtained by module 315. Based on the end points identified by end point identifier logic 652, agricultural harvester 100 or receiving machine 200, or both, can be controlled. For example, based on end points identified by end point identifier logic 652, material transfer controller 638 can generate control signals to end a material transfer operation, for instance, ending a material transfer operation prior to the agricultural harvester 100 or the receiving machine 200 traveling at an end point location.

Start point identifier logic 654 illustratively identifies locations at the worksite where a receiving machine 200 is to travel to begin a material transfer operation. In identifying the start point locations, start point identifier logic 654 can utilize one or more of the data items obtained by material transfer logistics module 315, limits identified by limit identifier logic 656, as well as end points identified by end point identifier logic 652. As an illustrative example, start point identifier logic 654 may obtain an indication that a material transfer operation is to be initiated (e.g., an indication the grain tank 111 of agricultural harvester 100 has reached a threshold fill level (e.g., 80%) or an operator input, or various other indications) as well as geographic location and heading data of agricultural harvester 100. Start point identifier logic 654 may also obtain end point information from end point identifier logic 652 that indicates one or more end points at the worksite, such as one or more end points along a prospective path of a receiving machine 200 traveling alongside agricultural harvester 100 during a material transfer operation. Start point identifier logic 654 may also obtain fill level information relative to the receiving machine 200, such as a current fill level and a target fill level. Start point identifier logic 654 may also obtain data indicative of the material transfer rate of agricultural harvester 100 (e.g., 5 bushels/second). Start point identifier logic 654 also obtains one or more speed maps 601. Based on the end point(s), the speed at which receiving machine 200 is to travel (as derived from the speed maps 601), the amount of material to be transferred (as derived from one or more of the fill level of the agricultural machine, the available capacity or target fill level of the receiving machine 200), the amount of time it will take to transfer the amount of material (as derived from the material transfer rate of the agricultural harvester 100), start point identifier logic 654 can identify a geographic location where a material transfer operation is to begin. In another example, start point identifier logic may identify a start point based on the capacity of receiving machine 200, the rate at which yield or mass is flowing into the on-board grain tank of the harvester 100, and the estimated (or predictive) yield ahead of the harvester 100 along its route. For instance, it may be that the transfer operation may need to start sooner or later to transfer a select amount of material by the end location based on the yield ahead of the harvester 100 and the rate at which yield or mass is flowing into the on-board grain tank.

Logistics map generator 657 generates a logistics map 661 that includes logistics speed characteristic values of the agricultural harvester 100. Logistics map generator 657 may alter a speed map 601 (e.g., 460, 461, or 602) based on one or more of end points identified by end point identifier logic 652, start points identified by starting point identifier logic 654, and limits identified by limit identifier logic 656. For example, logistics map generator 657 may alter speed characteristic values in a speed map 601 based on limits identified by limit identifier logic 656. For instance, the harvester 100 may have a travel speed limit, an acceleration limit, or a deceleration limit that is identified by limit identifier logic 656. For example, there may be a travel speed value in a map 601 of 6 miles per hour (MPH) at a given location. However, limit identifier logic 656 may identify travel speed limits of the agricultural harvester 100 at the given location. Thus, logistics map generator 657 may generate a logistics speed map that has an altered travel speed corresponding to the limit (e.g., 5.5 MPH). Where the limits are imposed during a material transfer operation, the values may be altered only in the area of the field, along the route of the harvester 100, corresponding to (e.g., between or between and beyond to a given or threshold distance) the start points and end points identified by start point identifier logic 654 and end point identifier logic 652 respectively. Additionally, logistics map generator 657 may alter speed characteristic values of a map 601 based on limits of the receiving machine 200. For instance, where the speed characteristics of the receiving machine 200 are limited, such as during a material transfer operation, the speed characteristic values in the map 601 corresponding to (e.g., between or between and beyond to a given or threshold distance) the start points and end points identified by start point identifier logic 654 and end point identifier logic 652 respectively can be altered such that the harvester 100 and receiving machine 200 can match speed and adjust position in order to perform the material transfer operation. Thus, logistics map generator 657 generates a logistics speed map 661 having logistics speed characteristic values. The logistics speed map 661 can be provided as a logistics output 668 for the control of agricultural harvester 100 or receiving machine 200, or both.

Display element integration component 658 can generate display elements to represent various information which can be integrated into a map, such as one or more of speed maps 601 or logistics map 661, or can be integrated into a display of one or more of speed maps 601 or logistics map 661, such as in the form of an overlay. For example, display element integration component 658 can generate end point display elements, start point display elements, speed characteristic values, as well as various other, which can be integrated into one or more speed maps 601 or logistics map 661 at the corresponding geographic locations in the map.

Figure 6:
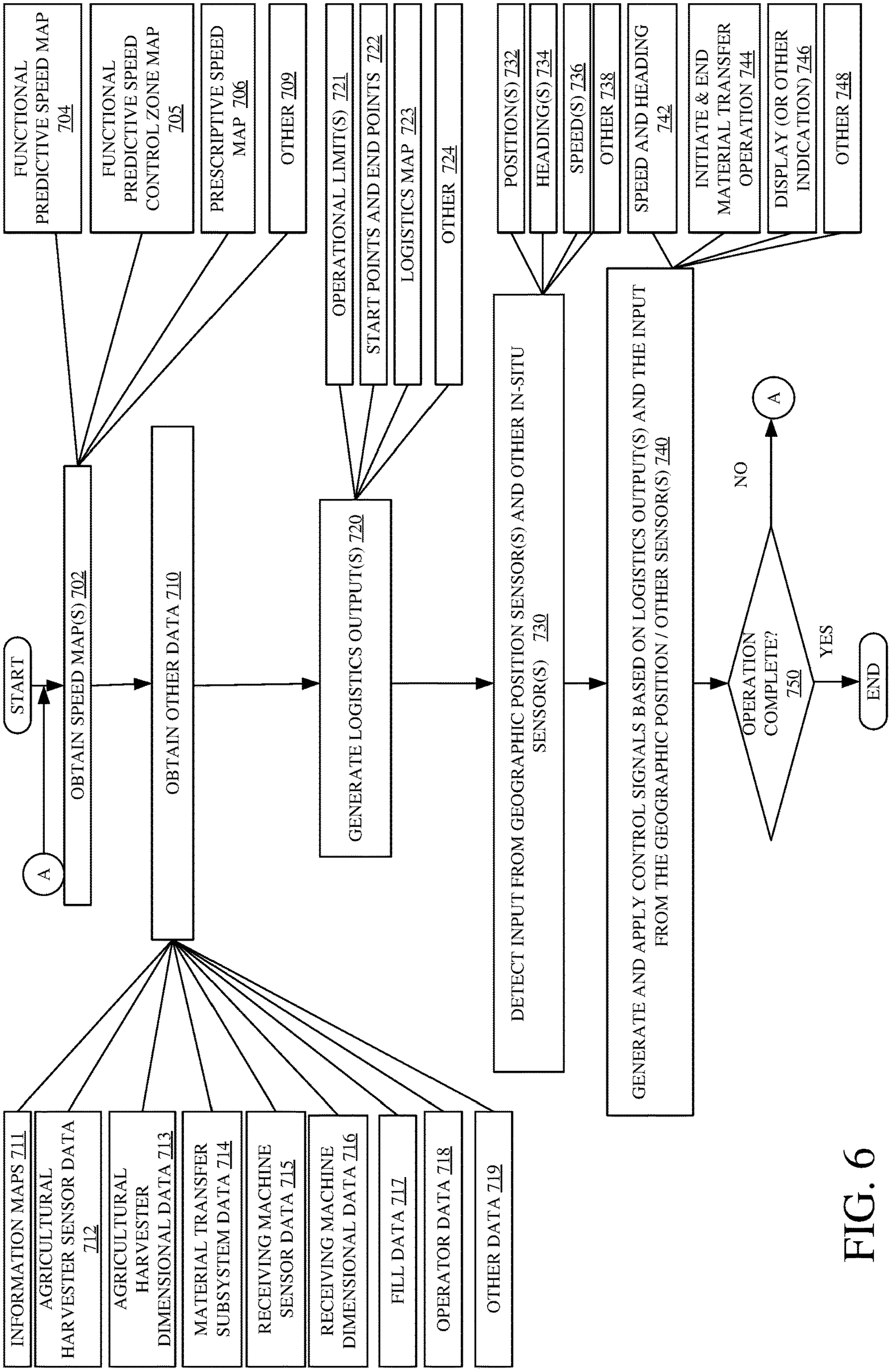
FIG. 6 is a flow diagram illustrating one example of operation of an agricultural system in controlling a mobile machine.

FIG. 6 is flowchart showing one example operation of agricultural system 400 in controlling an agricultural harvester 100 and receiving machine 200 in performing a material transfer operation.

At block 702 one or more speed maps 601 are obtained by material transfer logistics module 315 of agricultural system 400, such as one or more of functional predictive speed map (e.g., 460), as indicated by block 704, a functional predictive speed control zone map (e.g., 461), as indicated by block 705, a prescriptive speed map, as indicated by block 706, and another type of speed map, as indicated by block 709.

At block 710 various other data are obtained by material transfer logistics module 315 of agricultural system 400. For example, material transfer logistics module 315 can obtain one or more of the data items illustrated in FIG. 5. As indicated by block 711, a material transfer logistics module 315 can obtain one or more information maps 358. As indicated by block 712, material transfer logistics module 315 can obtain agricultural harvester sensor data 604. As indicated by block 713, material transfer logistics module 315 can obtain agricultural harvester dimensional data 606. As indicated by block 714, material transfer logistics module 315 can obtain material transfer subsystem data 607. As indicated by block 715, material transfer logistics module 315 can obtain receiving machine sensor data 608. As indicated by block 716, material transfer logistics module 315 can obtain receiving machine dimensional data 610. As indicated by block 717, material transfer logistics module 315 can obtain fill data 612. As indicated by block 718, material transfer logistics module 315 can obtain operator data 614. As indicated by block 719, material transfer logistics module 315 can obtain various other data 616.

At block 720 logistics module 315 generates one or more logistics outputs 668. As indicated by block 721, limit identifier logic 656 identifies operational limit(s) based on the data obtained at blocks 702 and 710 as well as based on various other inputs, such as operator or user inputs, stored preferences, etc. As indicated by block 722, end point identifier logic 652 identifies a geographic location of one or more end points on the field of interest based on the data obtained at blocks 702 and 710, operational limit(s), as well as based on various other inputs, such as operator or user inputs, stored preferences, etc. Additionally, at block 722, start point identifier logic 654 identifies a geographic location of a start point on the field of interest to which a receiving machine 200 is to travel to and where a material transfer operation is to be initiated. Start point identifier logic 654 can identify start points based on end point(s) identified by end point identifier logic 652, operational limit(s) identified by limit identifier logic 656, the various data obtained at blocks 702 and 710, as well as various other inputs, such as operator or user inputs, stored preferences, etc. As indicated by block 723, logistics map generator 657 can generate a logistics map 661 that maps speed characteristic values (e.g., altered speed characteristic values) as well as various other values or items, or both, at different geographic locations in the field. Logistics map generator 657 can generate a logistics map 661 based on the various data obtained at blocks 702 and 710, operational limits identified by limit identifier logic 656, start point(s) identified by start point identifier logic 654, end point(s) identified by end point identifier logic 652, as well as various other inputs, such as operator or user inputs, stored preferences, etc. Material transfer logistics module 315 can generate various other logistics outputs 668 as indicated by block 724.

At block 730, inputs from geographic position sensor as well as various other sensors can be obtained. As indicated by block 732, the position of agricultural harvester 100 can be obtained from geographic position sensor 126 and/or the position of receiving machine 200 can be obtained from geographic position sensor 226. As indicated by block 734 the current heading of agricultural harvester 100 can be obtained from heading/speed sensor 125 and/or the current heading of receiving machine 200 can be obtained from heading/speed sensor 225. As indicated by block 736, the current speed of agricultural harvester 100 can be obtained from heading/speed sensor 225 and/or the current speed of receiving machine 200 can be obtained from heading/speed sensor 225. Various other inputs from various other sensors can also be obtained, as indicated by block 738.

At block 740, control system 114 and/or 214 generate control signals based on the logistics output(s) 668 as well as the detected inputs at block 730. For example, as indicated by block 742, control system 214 can generate control signals to control the speed and heading of receiving machine 200. For instance, propulsion controller 670 can control propulsion subsystem 250 to control the speed characteristics of receiving machine 200 and path planning controller 672 can control steering subsystem 252 to control the heading of receiving machine 200. As an illustrative example, control system 214 can generate control signals to control the speed characteristics and heading of receiving machine 200 to travel to a start point in time to initiate a material transfer operation at the start point. Control system 214 can generate control signals to control the speed characteristics or heading of receiving machine 200 based on start points or end points. Control system 214 can generate control signals to control the speed characteristics or heading of receiving machine 200 based on operational limits. Additionally, control system 214 can generate control signals to control the speed characteristics or heading of the receiving machine 200 based on the logistics map 661.

At block 742, control system 114 can generate control signals to control the speed and heading of agricultural harvester 100. For instance, propulsion controller 630 can control propulsion subsystem 150 to control the speed characteristics of harvester 100 and path planning controller 632 can generate control signals to control steering subsystem 152 to control the heading of harvester 100. Control system 114 can generate control signals to control the speed characteristics or heading of harvester 100 based on start points or end points. Control system 114 can generate control signals to control the speed characteristics or heading of harvester 100 based on operational limits. Additionally, control system 114 can generate control signals to control the speed characteristics or heading of the harvester 100 based on the logistics map 661.

As indicated by block 744, control system 114 can generate control signals to agricultural harvester 100 to initiate a material transfer operation and end a material transfer operation based on the logistics output(s) 668. For instance, material transfer controller 638 can control material transfer subsystem 154 to initiate a material transfer operation in which material is transferred from agricultural harvester 100 to receiving machine 200. In some examples, that material transfer subsystem 154 may be controlled to extend out from a storage position based on the position and/or speed of the receiving machine 200 (as indicated by the inputs at block 723) such that the material transfer subsystem 154 is in operational position at the time the receiving machine 200 arrives at the starting point or at the time the harvester 100 arrives at the starting point. Additionally, the material transfer subsystem 154 may be controlled to initiate operation (e.g., begin actuating auger or blower) when receiving machine 200 arrives at the start point or when receiving machine 200 is within a threshold distance of or time from the start point. In another example, material transfer controller 638 can control material transfer subsystem 154 to end a material transfer operation. For instance, the material transfer subsystem 154 may be controlled to stop transferring material and return to a storage position once receiving machine 200 reaches an end point or is within a threshold distance of or time from an end point. Additionally, or alternatively, the material transfer subsystem 154 may be controlled to turn off the auger or blower to stop conveying material once receiving machine 200 reaches an end point or is within a threshold distance or time from an end point.

As indicated by block 746 control system 114 can generate control signals to control operator interface mechanisms 118 or user interface mechanisms 364, or both, to provide a display or other indication and control system 214 can generate control signals to control operator interface mechanisms 218 or user interface mechanisms 364, or both, to provide a display or other indication. For example, interface controller 636 can generate control signals to control operator interface mechanisms 118 or user interface mechanisms 364, or both, based on one or more logistics outputs 668, such as to display or otherwise indicate operational limits, to display a speed map 601 or a logistics map 661, display or otherwise indicate identified start points and end points, the location of agricultural harvester 100 and receiving machines 200. In one example, this can include displaying a map, such as one of speed maps 601 or logistics map 661, either of which can include speed characteristic values, end point display element(s), start point display element(s), agricultural harvester display element(s), and receiving machine display element(s) that are generated and integrated by display element integration component 658. In other examples, interface controller 636 can control interface mechanisms 118 or interface mechanisms 364, or both, to generate other visual, audible, or haptic outputs such as an output that indicates to the operator 360 of agricultural harvester 100 or user 366 to control harvester 100 to begin or end a material transfer operation.

In another example, interface controller 676 can generate control signals to control operator interface mechanisms 218 or user interface mechanisms 364, or both, based on one or more logistics outputs 668, such as display or otherwise indicate operational limits, to display a speed map 601 or a logistics map 661, display or otherwise indicate identified start points and end points, the location of agricultural harvester 100 and receiving machines 200. In one example, this can include displaying a map, such as one of speed maps 601 or logistics map 661, either of which can include speed characteristic values, end point display element(s), start point display element(s), agricultural harvester display element(s), and receiving machine display element(s) that are generated and integrated by display element integration component 658. In other examples, interface controller 636 can control interface mechanisms 218 or interface mechanisms 364, or both, to generate other visual, audible, or haptic outputs that indicate to the operator 360 or user 364, such as an output that indicates to the operator 360 of receiving machine 200 to control receiving machine 200 travel to a start point to begin a material transfer operation.

These are merely some examples. Control system 214 can generate various control signals to control various controllable subsystems 216 or other items of receiving machine 200 or other items of agricultural system 500 based on logistics outputs 668. Control system 114 can generate various control signals to control various controllable subsystems 116 or other items of harvester 100 or other items of agricultural system 500 based on logistics outputs 668.

Various other control signals can be generated and applied as indicated by block 748.

At block 750 it is determined if the harvesting operation is complete. If the harvesting operation has not been completed, operation returns to block 702 where the operation is commenced for another material transfer operation. If the harvesting operation has been completed, then the operation ends.

The examples herein describe the generation of a predictive model and, in some examples, the generation of a functional predictive map based on the predictive model. The examples described herein are distinguished from other approaches by the use of a model which is at least one of multi-variate or site-specific (i.e., georeferenced, such as map-based). Furthermore, the model is revised as the work machine is performing an operation and while additional in-situ sensor data is collected. The model may also be applied in the future beyond the current worksite. For example, the model may form a baseline (e.g., starting point) for a subsequent operation at a different worksite or at the same worksite at a future time.

The revision of the model in response to new data may employ machine learning methods. Without limitation, machine learning methods may include memory networks, Bayes systems, decisions trees, Eigenvectors, Cluster Analysis, Eigenvalues and Machine Learning, Evolutionary and Genetic Algorithms, Expert Systems/Rules, Support Vector Machines, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Random Forests, Reinforcement Learning or Reward-based machine learning. Learning may be supervised or unsupervised.

Model implementations may be mathematical, making use of mathematical equations, empirical correlations, statistics, tables, matrices, and the like. Other model implementations may rely more on symbols, knowledge bases, and logic such as rule-based systems. Some implementations are hybrid, utilizing both mathematics and logic. Some models may incorporate random, non-deterministic, or unpredictable elements. Some model implementations may make uses of networks of data values such as neural networks. These are just some examples of models.

The predictive paradigm examples described herein differ from non-predictive approaches where an actuator or other machine parameter is fixed at the time the machine, system, or component is designed, set once before the machine enters the worksite, is reactively adjusted manually based on operator perception, or is reactively adjusted based on a sensor value.

The functional predictive map examples described herein also differ from other map-based approaches. In some examples of these other approaches, an a priori control map is used without any modification based on in-situ sensor data or else a difference determined between data from an in-situ sensor and a predictive map are used to calibrate the in-situ sensor. In some examples of the other approaches, sensor data may be mathematically combined with a priori data to generate control signals, but in a location-agnostic way; that is, an adjustment to an a priori, georeferenced predictive setting is applied independent of the location of the work machine at the worksite. The continued use or end of use of the adjustment, in the other approaches, is not dependent on the work machine being in a particular defined location or region within the worksite.

In examples described herein, the functional predictive maps and predictive actuator control rely on obtained maps and in-situ data that are used to generate predictive models. The predictive models are then revised during the operation to generate revised functional predictive maps and revised actuator control. In some examples, the actuator control is provided based on functional predictive control zone maps which are also revised during the operation at the worksite. In some examples, the revisions (e.g., adjustments, calibrations, etc.) are tied to regions or zones of the worksite rather than to the whole worksite or some non-georeferenced condition. For example, the adjustments are applied to one or more areas of a worksite to which an adjustment is determined to be relevant (e.g., such as by satisfying one or more conditions which may result in application of an adjustment to one or more locations while not applying the adjustment to one or more other locations), as opposed to applying a change in a blanket way to every location in a non-selective way.

In some examples described herein, the models determine and apply those adjustments to selective portions or zones of the worksite based on a set of a priori data, which, in some instances, is multivariate in nature. For example, adjustments may, without limitation, be tied to defined portions of the worksite based on site-specific factors such as topography, soil type, crop variety, soil moisture, as well as various other factors, alone or in combination. Consequently, the adjustments are applied to the portions of the field in which the site-specific factors satisfy one or more criteria and not to other portions of the field where those site-specific factors do not satisfy the one or more criteria. Thus, in some examples described herein, the model generates a revised functional predictive map for at least the current location or zone, the unworked part of the worksite, or the whole worksite.

As an example, in which the adjustment is applied only to certain areas of the field, consider the following. The system may determine that a detected in-situ characteristic value (e.g., detected speed characteristic value) varies from a predictive value of the characteristic (e.g., predictive speed characteristic value), such as by a threshold amount. This deviation may only be detected in areas of the field where the elevation of the worksite is above a certain level. Thus, the revision to the predictive value is only applied to other areas of the worksite having elevation above the certain level. In this simpler example, the predictive characteristic value and elevation at the point the deviation occurred and the detected characteristic value and elevation at the point the deviation cross the threshold are used to generate a linear equation. The linear equation is used to adjust the predictive characteristic value in unharvested areas of the worksite in the functional predictive map as a function of elevation and the predicted characteristic value. This results in a revised functional predictive map in which some values are adjusted while others remain unchanged based on selected criteria, e.g., elevation as well as threshold deviation. The revised functional map is then used to generate a revised functional control zone map for controlling the machine.

As an example, without limitation, consider an instance of the paradigm described herein which is parameterized as follows.

One or more maps of the field are obtained, such as one or more of a vegetative index map, a predictive yield map, a biomass map, a crop state map, a topographic map, a soil property map, a seeding map, and another type of agricultural characteristic map.

In-situ sensors generate sensor data indicative of in-situ characteristic values, such as in-situ speed characteristic values.

A predictive model generator generates one or more predictive models based on the one or more obtained maps and the in-situ sensor data, such as a predictive speed model.

A predictive map generator generates one or more functional predictive maps based on a model generated by the predictive model generator and the one or more obtained maps. For example, the predictive map generator may generate a functional predictive speed map that maps predictive speed characteristic values to one or more locations on the worksite based on a predictive speed model and the one or more obtained maps.

Control zones, which include machine settings values, can be incorporated into the functional predictive speed map to generate a functional predictive speed control zone map.

As the mobile machine continues to operate at the worksite, additional in-situ sensor data is collected. A learning trigger criteria can be detected, such as threshold amount of additional in-situ sensor data being collected, a magnitude of change in a relationship (e.g., the in-situ characteristic values varies to a certain [e.g., threshold] degree from a predictive value of the characteristic), and operator or user makes edits to the predictive map(s) or to a control algorithm, or both, a certain (e.g., threshold) amount of time elapses, as well as various other learning trigger criteria. The predictive model(s) are then revised based on the additional in-situ sensor data and the values from the obtained maps. The functional predictive maps or the functional predictive control zone maps, or both, are then revised based on the revised model(s) and the values in the obtained maps.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic, modules, generators, and interactions. It will be appreciated that any or all of such systems, components, logic, modules, generators, and interactions may be implemented by hardware items, such as one or more processors, one or more processors executing computer executable instructions stored in memory, memory, or other processing components, some of which are described below, that perform the functions associated with those systems, components, logic, modules, generators, or interactions. In addition, any or all of the systems, components, logic, modules, generators, and interactions may be implemented by software that is loaded into a memory and is subsequently executed by one or more processors or one or more servers or other computing component(s), as described below. Any or all of the systems, components, logic, modules, generators, and interactions may also be implemented by different combinations of hardware, software, firmware, etc., some examples of which are described below. These are some examples of different structures that may be used to implement any or all of the systems, components, logic, modules, generators, and interactions described above. Other structures may be used as well.

Figure 7:
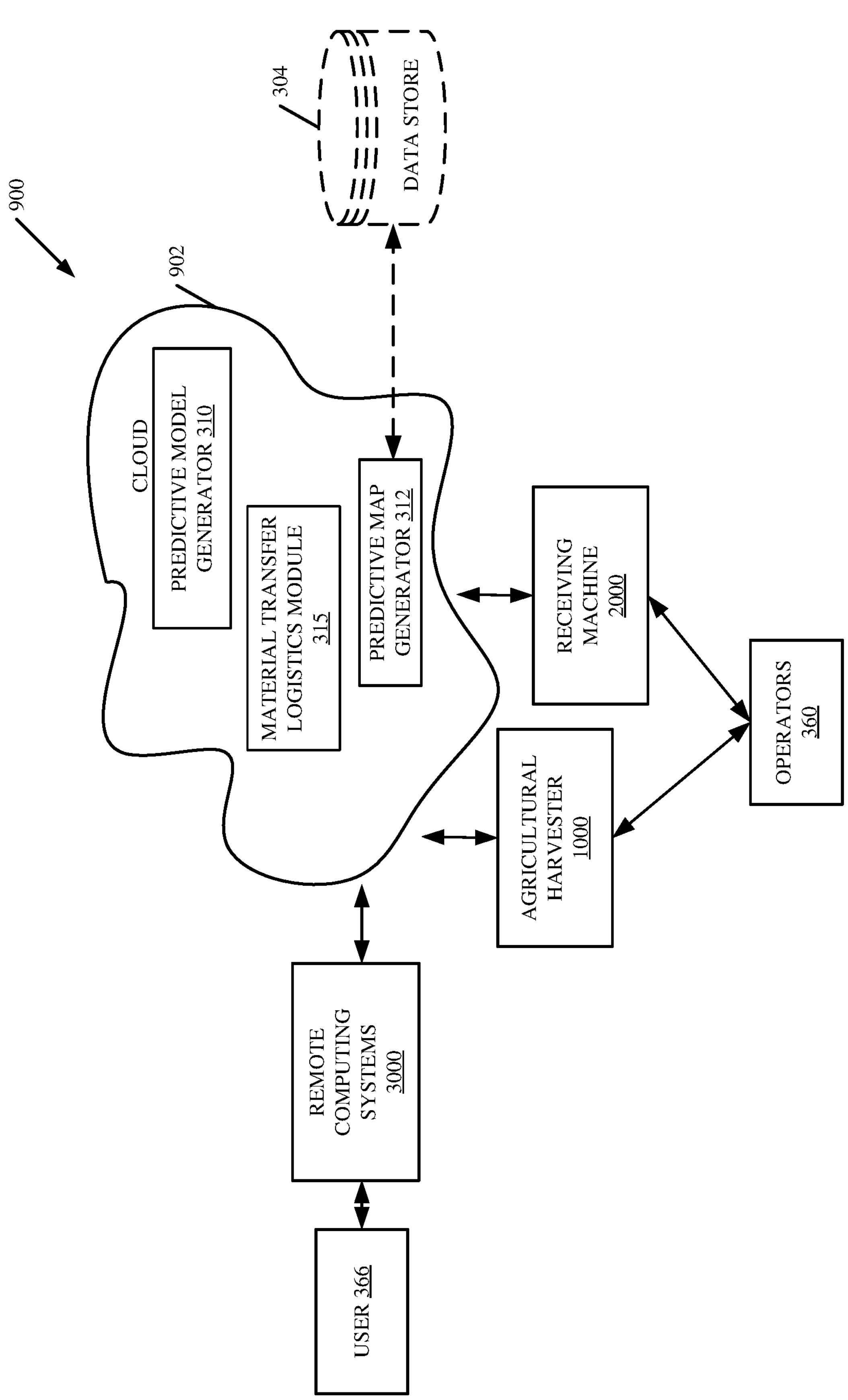
FIG. 7 is a block diagram showing one example of a mobile machine in communication with a remote server environment.

FIG. 7 is a block diagram of agricultural harvester 1000, which may be similar to mobile machine 100 shown in FIG. 3, receiving machine 2000, which may be similar to receiving machine 200 shown in FIG. 2, and remote computing systems 3000, which may be similar to remote computing systems 300 shown in FIG. 2. The agricultural harvester 1000, receiving machine 2000, and remote computing system 3000 communicates with elements in a remote server architecture 900. In some examples, remote server architecture 900 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in FIG. 2 as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 7, some items are similar to those shown in FIG. 2 and those items are similarly numbered. FIG. 7 specifically shows that predictive model generator 310, predictive map generator 312, and material transfer logistics module 315 may be located at a server location 902 that is remote from the agricultural harvester 1000, the receiving machine 2000, and the remote computing systems 3000. Therefore, in the example shown in FIG. 7, agricultural harvester 1000, receiving machine 2000, and remote computing systems 3000 accesses systems through remote server location 902. In other examples, various other items may also be located at server location 902, such as data store 302, map selector 309, predictive model 311, functional predictive maps 263 (including predictive maps 264 and predictive control zone maps 265), control zone generator 313, control system 314, and processing system 338.

FIG. 7 also depicts another example of a remote server architecture. FIG. 7 shows that some elements of FIG. 2 may be disposed at a remote server location 902 while others may be located elsewhere. By way of example, data store 302 may be disposed at a location separate from location 902 and accessed via the remote server at location 902. Regardless of where the elements are located, the elements can be accessed directly by agricultural harvester 1000, receiving machine 2000, and remote computing systems 3000 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As the agricultural harvester 1000 or receiving machine 2000, or both, comes close to the machine containing the information collection system, such as a fuel truck prior to fueling, the information collection system collects the information from the agricultural harvester 1000 or the receiving machine 2000, or both, using any type of ad-hoc wireless connection. The collected information may then be forwarded to another network when the machine containing the received information reaches a location where wireless telecommunication service coverage or other wireless coverage—is available. For instance, a fuel truck may enter an area having wireless communication coverage when traveling to a location to fuel other machines or when at a main fuel storage location. All of these architectures are contemplated herein. Further, the information may be stored on the agricultural harvester 1000 or the receiving machine 2000, or both, until the agricultural harvester 1000 or the receiving machine 2000, or both, enters an area having wireless communication coverage. The agricultural harvester 1000, itself, may send the information to another network. The receiving machine 2000, itself, may send the information to another network.

It will also be noted that the elements of FIG. 2, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 902 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 8:
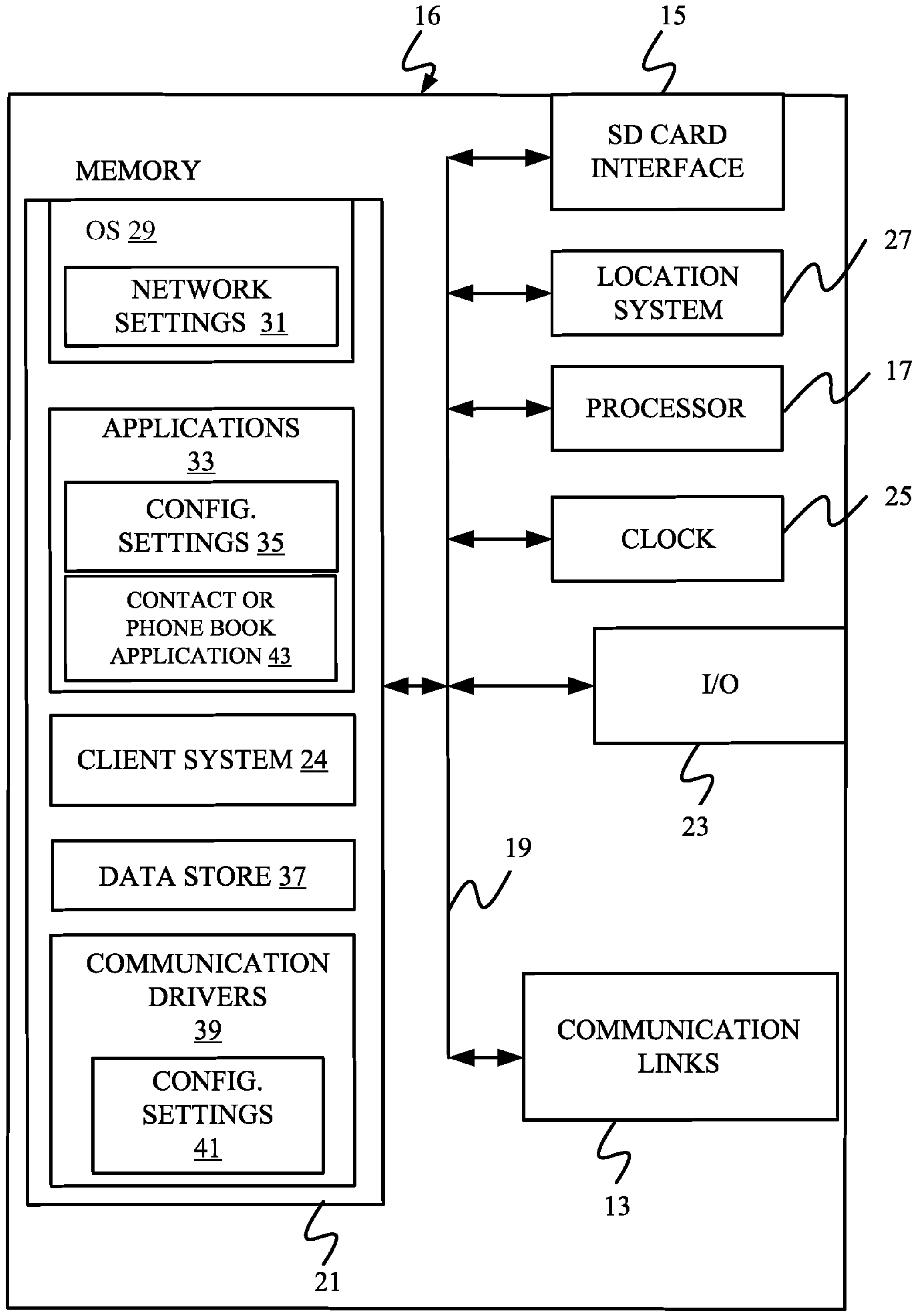
FIGS. 8-10 show examples of mobile devices that can be used in a mobile machine.

FIG. 8 is a simplified block diagram of one illustrative example of a handheld or mobile computing device that can be used as a user's or client's hand held device 16, in which the present system (or parts of it) can be deployed. For instance, a mobile device can be deployed in the operator compartment of mobile machine 100 for use in generating, processing, or displaying the maps discussed above. FIGS. 13-14 are examples of handheld or mobile devices.

FIG. 8 provides a general block diagram of the components of a client device 16 that can run some components shown in FIG. 3, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

Figure 9:
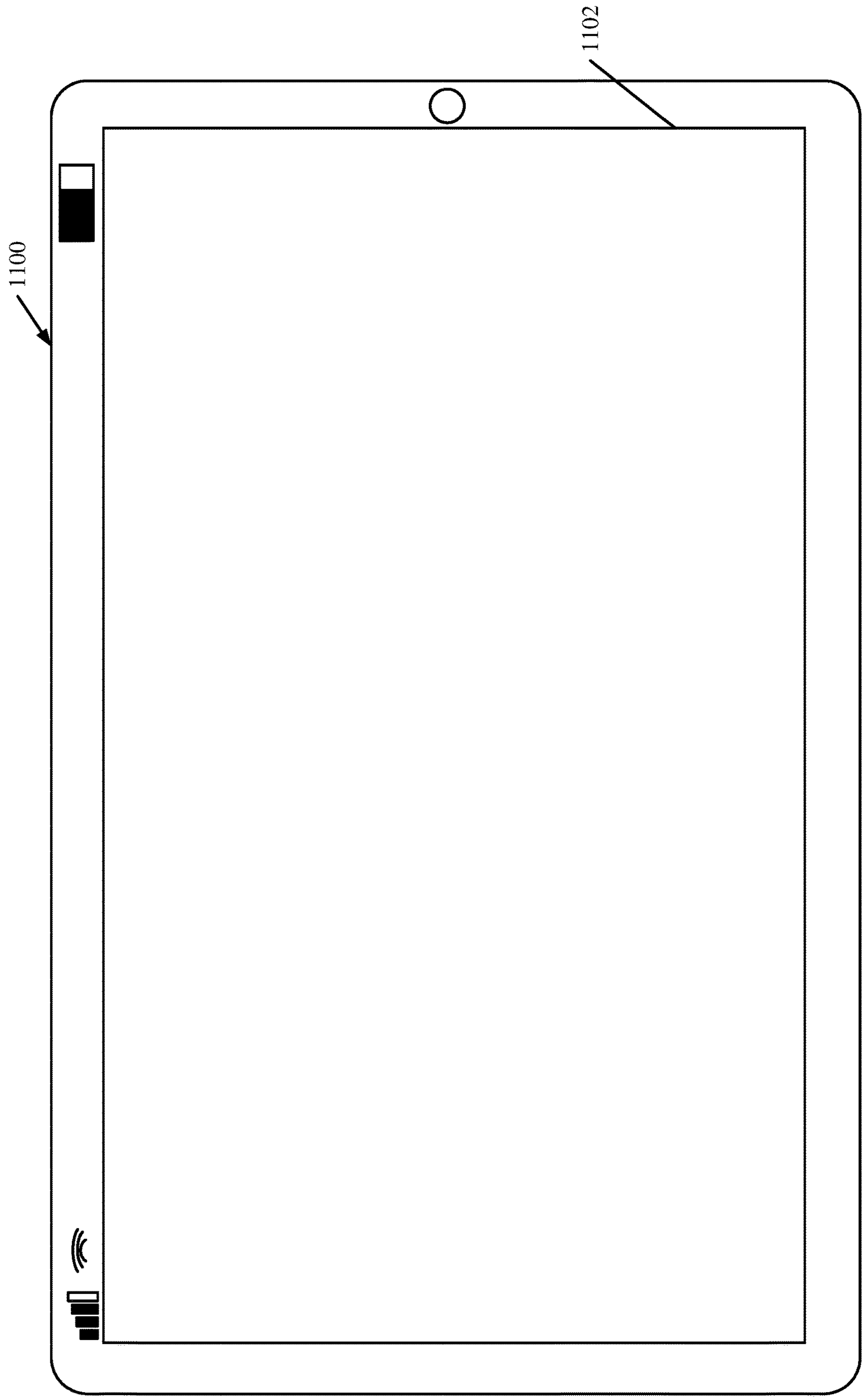

FIG. 9 shows one example in which device 16 is a tablet computer 1100. In FIG. 9, computer 1100 is shown with user interface display screen 1102. Screen 1102 can be a touch screen or a pen-enabled interface that receives inputs from a pen or stylus. Tablet computer 1100 may also use an on-screen virtual keyboard. Of course, computer 1100 might also be attached to a keyboard or other user input device through a suitable attachment mechanism, such as a wireless link or USB port, for instance. Computer 1100 may also illustratively receive voice inputs as well.

Figure 10:
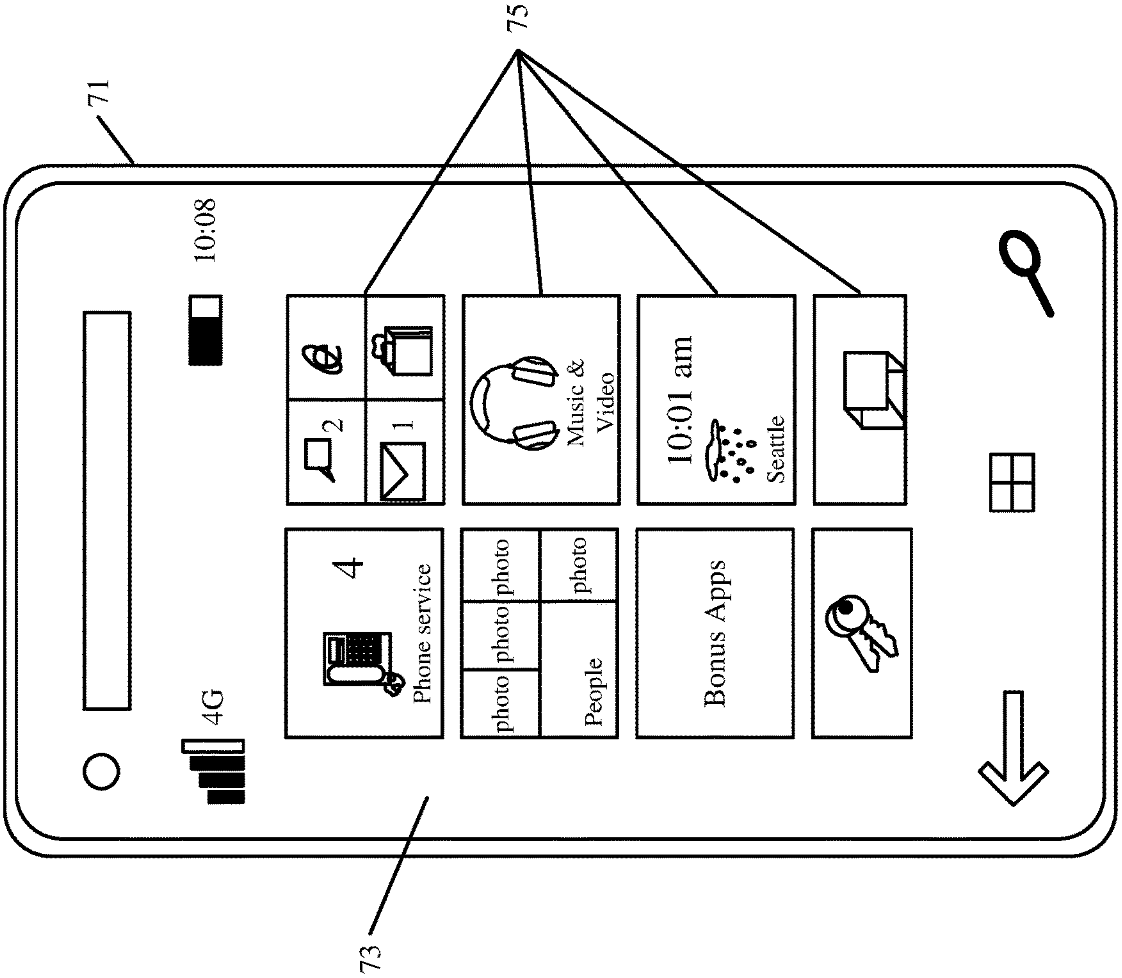

FIG. 10 is similar to FIG. 9 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
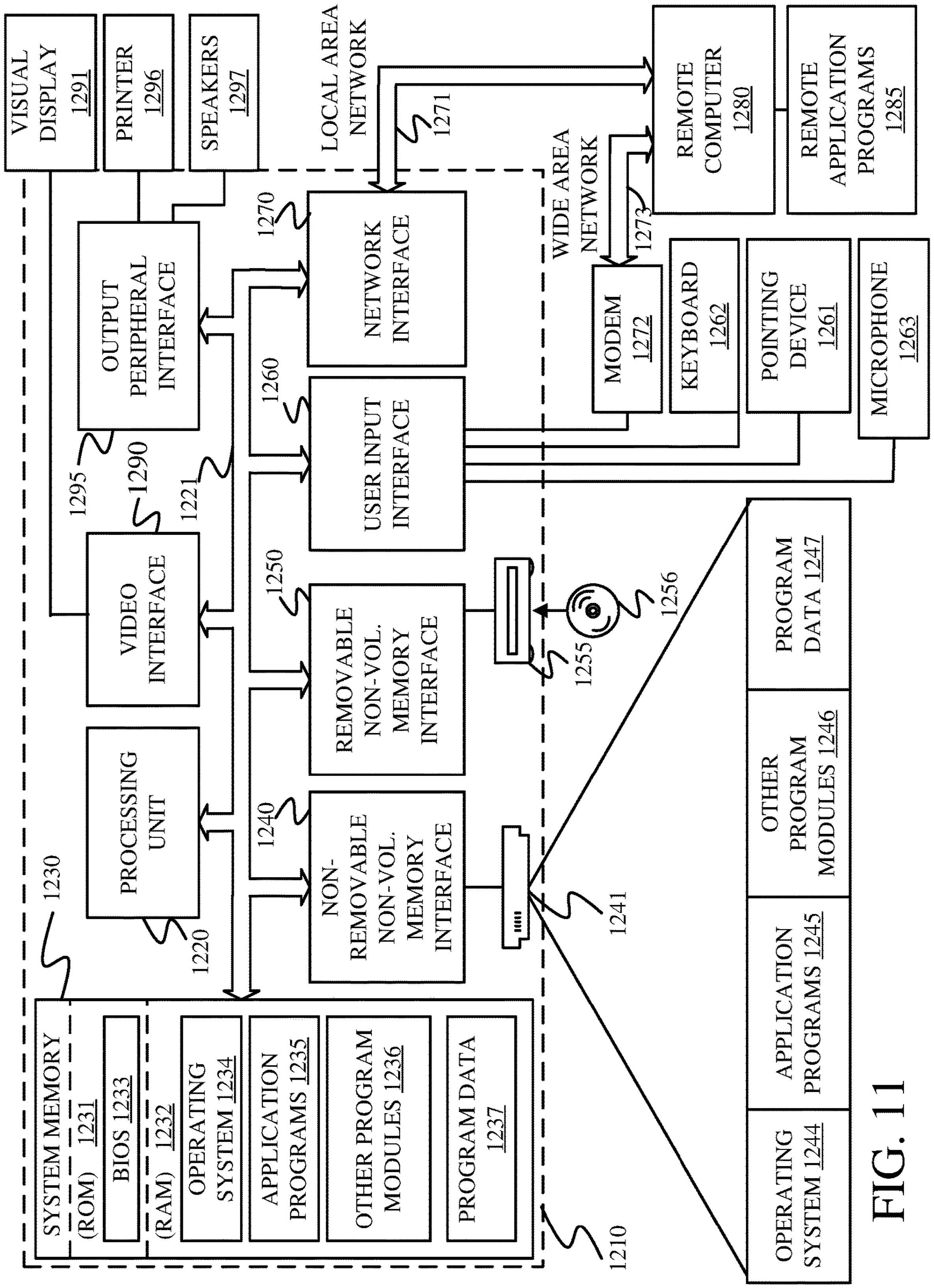
FIG. 11 is a block diagram showing one example of a computing environment that can be used in a mobile machine.

FIG. 11 is one example of a computing environment in which elements of previous figures described herein can be deployed. With reference to FIG. 11, an example system for implementing some embodiments includes a computing device in the form of a computer 1210 programmed to operate as discussed above. Components of computer 1210 may include, but are not limited to, a processing unit 1220 (which can comprise processors or servers from previous FIGS.), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. Memory and programs described with respect to previous figures described herein can be deployed in corresponding portions of FIG. 11.

Computer 1210 typically includes a variety of computer readable media. Computer readable media may be any available media that can be accessed by computer 1210 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 11 illustrates operating system 1234, application programs 1235, other program modules 1236, and program data 1237.

The computer 1210 may also include other removable/non-removable volatile/nonvolatile computer storage media. By way of example only, FIG. 11 illustrates a hard disk drive 1241 that reads from or writes to non-removable, nonvolatile magnetic media, an optical disk drive 1255, and nonvolatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 1210. In FIG. 11, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user may enter commands and information into the computer 1210 through input devices such as a keyboard 1262, a microphone 1263, and a pointing device 1261, such as a mouse, trackball or touch pad. Other input devices (not shown) may include a joystick, game pad, satellite dish, scanner, or the like. These and other input devices are often connected to the processing unit 1220 through a user input interface 1260 that is coupled to the system bus, but may be connected by other interface and bus structures. A visual display 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 is operated in a networked environment using logical connections (such as a controller area network—CAN, local area network—LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules may be stored in a remote memory storage device. FIG. 11 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. An agricultural system comprising:
- a control system that:
  - obtains a map that maps values of a speed characteristic of an agricultural harvester to different geographic locations in a worksite; and
  - generates a control signal to control a receiving machine based on the values of the speed characteristic of the agricultural harvester mapped to the different geographic locations in the worksite,
  - wherein the values of the speed characteristic comprise predictive values of the speed characteristic of the agricultural harvester, and the control signal controls a speed of the receiving machine based on the predictive values of the speed characteristic of the agricultural harvester.

2. The agricultural system of claim 1 and further comprising:
- a predictive model generator that:
  - obtains an information map that includes values of a characteristic corresponding to different geographic locations in a worksite;
  - obtains, from an in-situ sensor, an in-situ value of a speed characteristic of the agricultural harvester corresponding to a geographic location; and
  - generates a predictive speed model that models a relationship between values of the characteristic and values of the speed characteristic based on the in-situ value of the speed characteristic corresponding to the geographic location and a value of the characteristic in the information map at the geographic location to which the in-situ value of the speed characteristic corresponds; and
- a predictive map generator that generates, as the map that maps values of the speed characteristic, a functional predictive speed map of the worksite that maps predictive values of the speed characteristic of the agricultural harvester to the different geographic locations in the worksite, based on the values of the characteristic in the information map and based on the predictive speed model.

3. The agricultural system of claim 2, wherein the information map comprises two or more information maps, wherein each one of the two or more information maps includes values of a respective characteristic corresponding to the different geographic locations in the worksite, wherein the two or more information maps comprise two or more of:

a vegetative index map that maps, as the values of the respective characteristic, vegetative index values to the different geographic locations in the worksite;

a yield map that maps, as the values of the respective characteristic, yield values to the different geographic locations in the worksite;

a biomass map that maps, as the values of the respective characteristic, biomass values to the different geographic locations in the worksite;

a crop state map that maps, as the values of the respective characteristic, crop state values to the different geographic locations in the worksite;

a topographic map that maps, as the values of the respective characteristic, topographic values to the different geographic locations in the worksite;

a soil property map that maps, as the values of the respective characteristic, soil property values to the different geographic locations in the worksite; and a seeding map that maps, as the values of the respective characteristic, seed characteristic values to the different geographic locations in the worksite; and wherein the predictive speed model models a relationship between two or more of the vegetative index values, the yield values, the biomass values, the crop state values, the topographic values, the soil property values, and the seeding characteristic values and speed characteristic values based on the in-situ value of the speed characteristic corresponding to the geographic location and two or more of the vegetative index value, the yield value, the biomass value, the crop state value, the topographic value, the soil property value, and the seeding characteristic value, in the two or more information maps, at the geographic location to which the in-situ value of the speed characteristic corresponds, the predictive speed model being configured to receive two or more of a vegetative index value, a yield value, a biomass value, a crop state value, a topographic value, a soil property value, and a seeding characteristic value, as model inputs, and generate a speed characteristic value as a model output.

4. The agricultural system of claim 3, wherein the functional predictive speed map of the worksite maps predictive values of the speed characteristic to the different geographic locations in the worksite based on two or more of the vegetative index values, the yield values, the biomass values, the crop state values, the topographic values, the soil property values, and the seeding characteristic values in the two or more information maps and based on the predictive speed model.

5. The agricultural system of claim 1 and further comprising:

a material transfer logistics module that generates, as the map that maps the predictive values of the speed characteristic of the agricultural harvester to different geographic locations in the worksite, a logistics speed map.

6. The agricultural system of claim 5, wherein the material transfer logistics module identifies an operational limit that corresponds to at least one of the agricultural harvester or the receiving machine; and based on the operational limit, generates the logistics speed map that maps the predictive values of the speed characteristic of the agricultural harvester to the different geographic locations in the worksite.

7. The agricultural system of claim 6, wherein the predictive values of the speed characteristic comprise a second set of values of the speed characteristic, and wherein material transfer logistics module:

receives a speed map that maps a first set of values of the speed characteristic corresponding to the different geographic locations in the worksite; and alters at least one value of the first set of values of the speed characteristic, based on the operational limit, to generate the second set of values of the speed characteristic.

8. The agricultural system of claim 1 and further comprising:

a material transfer logistics module that identifies at least one of:

an end point location on the worksite indicative of a location at which a material transfer operation is to end, or a start point location on the worksite indicative of a location at which the material transfer operation is to start based on the end point location, wherein the control signal controls the receiving machine based on the at least one of the end point location or the start point location.

9. The agricultural system of claim 1, wherein the control signal controls the receiving machine during unloading of material from the agricultural harvester to the receiving machine.

10. A computer implemented method comprising:

obtaining a map that maps predictive values of a speed characteristic of an agricultural harvester to different geographic locations in a worksite; and controlling a speed of a receiving machine based on the predictive values of the speed characteristic of the agricultural harvester mapped to the different geographic locations in the worksite.

11. The computer implemented method of claim 10 wherein obtaining the map comprises:

obtaining an information map that indicates values of a characteristic corresponding to different geographic locations in a worksite;

obtaining a value of a speed characteristic of the agricultural harvester corresponding to a geographic location;

generating a predictive speed model that models a relationship between the characteristic and the speed characteristic;

controlling a predictive map generator to generate a functional predictive speed map of the worksite, that maps, as the values of the speed characteristic, predictive values of the speed characteristic to the different geographic locations in the worksite based on the values of the characteristic in the information map and the predictive speed model.

12. The computer implemented method of claim 10, wherein obtaining the map comprises:

obtaining data indicative of a characteristic at the worksite; and identifying an operational limit indicative of a parameter limit of a speed characteristic of the agricultural harvester or the receiving machine.

13. The computer implemented method of claim 12, wherein obtaining the map comprises:

obtaining a first map that maps a first set of values of the speed characteristic of the agricultural harvester to the different geographic locations in the worksite;

altering, based on the operational limit, at least one value of the first set of values of the speed characteristic to obtain at least one altered value; and generating, as the map, a logistics map that maps, as the values of the speed characteristic of the agricultural harvester, a second set of values of the speed characteristic of the agricultural harvester to the different geographic locations based on the at least one altered value.

14. The computer implemented method of claim 10 and further comprising obtaining fill data and wherein controlling the receiving machine comprises controlling a speed characteristic of the receiving machine based on the map and the fill data.

15. A material receiving machine comprising:

a material receptacle configured to receive harvested material;

a controllable subsystem;

a communication system configured to obtain data indicative of speed characteristic values of an agricultural harvesting machine at unharvested geographic locations in a worksite; and a control system configured to generate control signals to control the controllable subsystem based on the speed characteristic values of the agricultural harvesting machine at the unharvested geographic locations in the worksite.

16. The material receiving machine of claim 15, wherein the speed characteristic values comprise predictive speed characteristic values, and the data are in the form of a map that maps the predictive speed characteristic values of the agricultural harvesting machine to different geographic locations in the worksite.

17. The material receiving machine of claim 15 and further comprising a material transfer logistics module configured to:

identify an operational limit; and identify an end point location on the worksite indicative of a location at which a material transfer operation is to end based on the operational limit.

18. The material receiving machine of claim 17, wherein the material transfer logistics module is further configured to identify a start point indicative of a location at which a material transfer operation is to start based on the end point location.

19. The material receiving machine of claim 15, wherein the speed characteristic values comprise predictive speed characteristic values, and the controllable subsystem comprises a propulsion subsystem that is configured to propel the material receiving machine, and the control signals control the propulsion subsystem based on the predictive speed characteristic values of the agricultural harvesting machine.

20. The material receiving machine of claim 15, and further comprising:

a predictive model generator that:

obtains an information map that includes values of a characteristic corresponding to different geographic locations in a worksite;

obtains, from an in-situ sensor, an in-situ value of a speed characteristic of the agricultural harvesting machine corresponding to a geographic location; and generates a predictive speed model that models a relationship between values of the characteristic and values of the speed characteristic based on the in-situ value of the speed characteristic corresponding to the geographic location and a value of the characteristic in the information map at the geographic location to which the in-situ value of the speed characteristic corresponds; and a predictive map generator that generates, as the map that maps values of the speed characteristic, a functional predictive speed map of the worksite that maps predictive values of the speed characteristic of the agricultural harvesting machine to the different geographic locations in the worksite, based on the values of the characteristic in the information map and based on the predictive speed model.

* * * * *